United States Patent [19]

Geary et al.

[11] Patent Number: 5,206,950
[45] Date of Patent: Apr. 27, 1993

[54] SOFTWARE DEVELOPMENT SYSTEM AND METHOD USING EXPANDING OUTLINE INTERFACE

[75] Inventors: Michael E. Geary, Los Gatos; Umang P. Gupta, San Mateo; David W. Roth, Mountain View; Donal B. Scott, Santa Clara, all of Calif.

[73] Assignee: Gupta Technologies, Inc., Menlo Park, Calif.

[21] Appl. No.: 767,557

[22] Filed: Jul. 8, 1991

Related U.S. Application Data

[63] Continuation of Ser. No. 248,406, Sep. 23, 1988, abandoned.

[51] Int. Cl.$^5$ ............................................. G06F 15/40
[52] U.S. Cl. ............................ 395/600; 364/DIG. 1; 364/282.1; 364/283.2; 364/286; 364/286.1
[58] Field of Search .......................... 395/600, 700

[56] References Cited

U.S. PATENT DOCUMENTS

| | | | |
|---|---|---|---|
| 4,445,169 | 4/1984 | Wakita et al. | 364/900 |
| 4,802,165 | 1/1989 | Ream | 371/19 |
| 4,945,475 | 7/1990 | Bruffey et al. | 395/600 |

Primary Examiner—Michael R. Fleming
Assistant Examiner—Debra A. Chun
Attorney, Agent, or Firm—Flehr, Hohbach, Test, Albritton & Herbert

[57] ABSTRACT

A system and method for specifying a computer program. The specified computer program comprises a set of selected program objects, represented by a corresponding set of outline items arranged in a multilevel outline format. These outline items collectively and completely denote the nature and operation of the specified computer program. Each outline item has a set of predefined characteristics, including a set of required children, and a set of optional children, comprising outline items that must/may be included at the next lower outline level when this outline item is used in a computer program. For each outline item in a computer program an expansion denoting flag denotes whether the corresponding outline item has children and whether the display of those children has been enabled. A selected contiguous portion of the multilevel outline is shown on the computer system's display device, showing only outline items whose display is enabled by corresponding expansion display denoting flags. A user interface enables the user to enable and disable expansion of any specified outline items. In response to such changes, the display definition is expanded and collapsed in accordance with the changed expansion display denoting flags. The user interface also enables the user to define menus and other display oriented objects by providing an interactive drawing program for designing a visual display and automatically adding the corresponding outline items to a selected computer program.

10 Claims, 10 Drawing Sheets

SOFTWARE DEVELOPMENT SYSTEM AND METHOD USING EXPANDING OUTLINE INTERFACE This is a continuation of patent application Ser. No. 07/248,406, filed Sep. 23, 1988 now abandoned.

The present invention relates generally to computer software development systems, and particularly to methods and systems for developing database application software and to so-called fourth generation computer languages.

A portion of the disclosure of this patent document contains materials to which a claim of copyright protection is made. The copyright owner has no objection to the facsimile reproduction by anyone of the patent document or the patent disclosure, but reserves all other rights whatsoever.

BACKGROUND OF THE INVENTION

The present invention is what is often called a software development system—that is, a system and method for facilitating the writing and modification of computer programs.

A commonly used, or at least advocated method of writing computer programs is called "top down" programming. The basic principle of top down programming is that the programmer should determine the general methodology to be used by the program and should design the basic structure of the program before focusing on the detailed aspects of actually writing the program.

However, there is a well known tendency among programmers to use what is known as the "bottom-up" approach to programming. A typical bottom-up strategy is to first attack the "hardest" problem or problems associated with a particular program, and then add the remaining code needed to complete the program. This approach to programming, typically results in computer programs which are poorly organized, difficult to modify without creating new problems, and undocumented for others needing to determine how the program works.

One of the goals of so-called fourth generation computer languages is to provide tools that encourage top-down programming, and to thereby generate well organized computer programs that are easy to understand and modify as needed. Fourth generation languages are also tools for improving programmer productivity by reducing the amount of effort required when using standard programming languages such as C, Pascal and Fortran.

Thus one of the objects of the present invention is to provide a program development system which encourages top-down programming.

Along with top-down programming, a related object of the present invention is to enable and facilitate prototyping—that is, enabling the programmer to prototype and test portions of a program, such as its visual appearance and menus, and then use the tested portions as a basis for adding the code necessary to make the program run.

One of the key concepts incorporated in the present invention is complete integration between the "objects" comprising a computer program and a hierarchical outline which represents the computer program. That is, for every object in the computer program (e.g., every subroutine, function, menu, dialogue box, and so on) there is a corresponding entry or set of entries in an expandable, multilevel outline.

The multilevel program outline generated by the present invention is a complete representation of a computer program. Using a specialized outline editor to build and modify hierarchical program outlines, each item in a program outline can be expanded or collapsed to provide the user access to all aspects of the program at the level of detail that the user wants. Thus the outline editor allows the programmer to see an entire program at one time without compromising the principles of top-down programming, sometimes herein referred to as progressive disclosure (i.e., the showing of progressively greater levels of detail as items in the outline are expanded to show their constituent elements).

Thus it is an object of the present invention to provide a program development system which generates hierarchical program outlines that completely represent the objects comprising a computer program.

Outline editors have been used in other types of software products, such as ThinkTank and More (both published by Symantec)—programs which help one organize one's thoughts using a collapsible outline structure.

While these outline editors could be used to write computer programs, these outliner editors generally put no limits or constraints on the nature of the items at each level of the outline hierarchy. Therefore the outline programs would allow the author to write programs with illegal syntax, and to use logically inconsistent combinations of objects and program statements.

One of the objects of the present invention is to provide a program development system which incorporates predefined limits on the types of program statements or objects that can be incorporated in a computer program, based on the context of that item in the hierarchical program outline which represents the computer program.

Another shortcoming of the prior art outliner editors is that they generally do not have a display oriented interface for generating menus and other display oriented program objects. Similarly, prior art programs for generating menus and other displays do not generate corresponding program outlines that can be viewed and edited by the user. It is therefore an object of the present invention to provide a display oriented user interface for generating display oriented program objects, and which automatically generates the outline items in the portion of the program outline corresponding to the program object being generated.

SUMMARY OF THE INVENTION

In summary, the present invention is a system and method for specifying computer programs using a programmed digital computer having a display. The specified computer program comprises outline items selected from a predefined set of outline items, arranged in a multilevel outline format. The items at each outline level except the topmost level are the children of the preceding outline item at the next outline higher level.

From another perspective, the specified computer program comprises a set of selected program objects, represented by a corresponding set of outline items arranged in a multilevel outline format. These outline items collectively and completely denote the nature and operation of the specified computer program.

The usage of each outline item is governed by a predefined set of outline, item characteristics, including a set of required children and a set of optional children. Required children are outline items that must be included at the next lower outline level when the parent item is used in a computer program. Optional children are outline items that may be included at the next lower outline level when the parent item is used in a computer program.

For each outline item in a computer program an expansion denoting means denotes whether the corresponding outline item has children and whether the display of those children has been enabled. A display definition corresponding to the multilevel computer program outline shows, in outline form, the topmost level of the multilevel outline and the children for each higher level outline item for which expansion has been enabled. A selected contiguous portion of the display definition is shown on the computer system's display device.

In another aspect of the present invention, a user interface enables the user to enable and disable the expansion of specified outline items. In response to such changes, the display definition is expanded and collapsed in accordance with the changed expansion display denoting means. The user interface also enables the user to define menus and other display oriented objects by providing an interactive drawing program for designing a visual display and automatically adding the corresponding outline items to a selected computer program.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
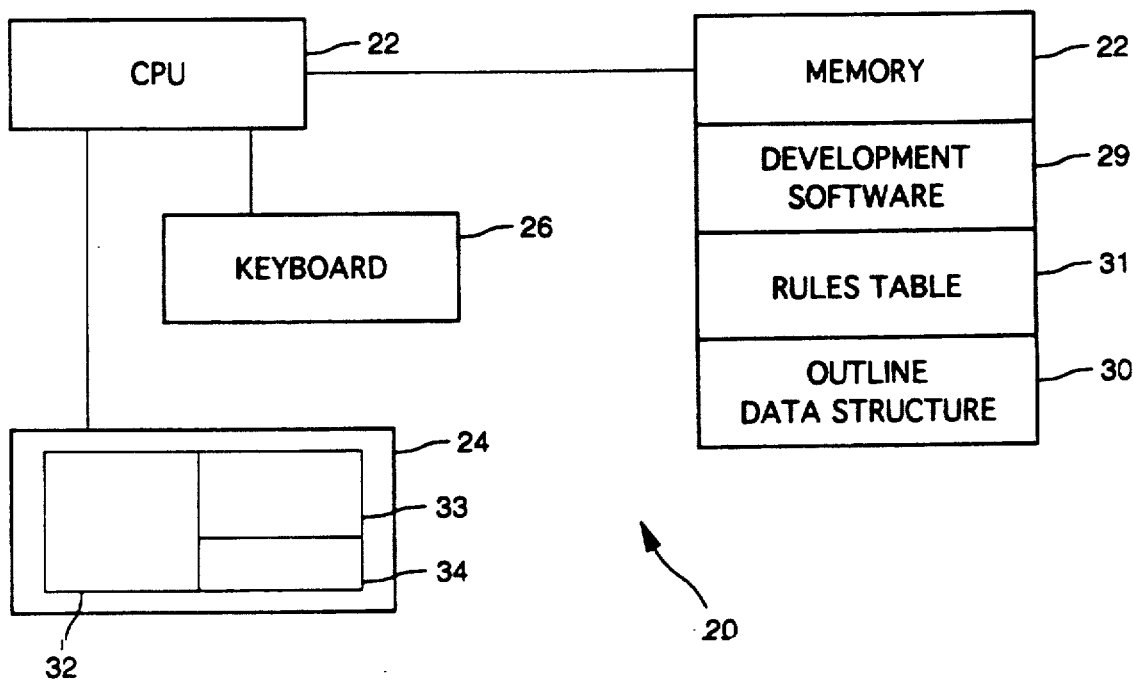
FIG. 1 is a block diagram of a computer system incorporating a preferred embodiment of the present invention.

Referring to FIG. 1, there is shown a computer system 20 having a central processing unit 22, a display 24, one of more input devices 26 such as a keyboard and a mouse, and memory 28. The memory 28 typically includes random access memory and disk or other non-volatile storage, as well as read only memory. The present invention can be used on any general purpose computer which incorporates a high speed visual display. Even a graphics display is not required, since a character display could perform all of the essential display functions associated with the invention. Thus the invention does not depend on any particular configuration of memory 28 and input/output devices.

FIG. 1 schematically depicts three portions of the information stored in memory 28 which particularly relate to the present invention. Development software 29 controls the process of writing and modifying computer programs. Outline data structure 30 stores and represents a program generated through the use of the development software. Rules table 31 specifies rules that govern the use of each type of program statement that can be used in computer programs written using the development software 29. The features and functions of these items are described in detail below.

Figure 2:
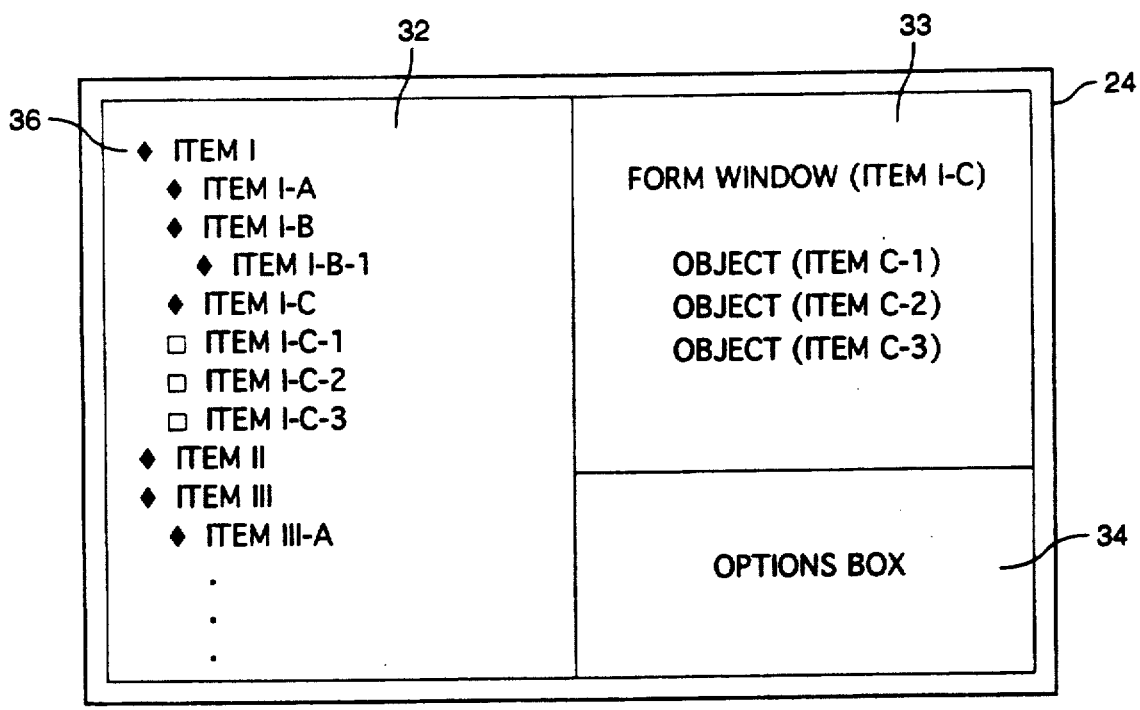
FIG. 2 schematically depicts a multiple window display generated by the preferred embodiment.

The screen display shown in FIGS. 1 and 2 is divided into a plurality of window regions 32-34. More generally, the preferred embodiment displays multiple windows to simultaneously display a portion of a program outline (window 32) and a corresponding display oriented object (window 33), such as a window. Additional simultaneously displayed windows, such as window 34, can display other information useful to a programmer. In the example shown in FIG. 2, window region 34 is used as an "Option Box" to display a list of outline items or objects that can be legally entered at a selected position in a program outline.

The preferred embodiment uses Windows, a program published by Microsoft Corporation, to generate multiple windows and to handle communications between windows and other aspects of the management of multiple windows. Publicly available documentation explains what Windows does, how it works, and how it may be used. Microsoft Windows, Software Development Kit, Programming Tools, Version 2.0 (Microsoft Corporation) and Microsoft Windows, Software Development Kit, Programmer's Learning Guide, Version 2.0 (Microsoft Corporation) are hereby incorporated by reference.

Window region 32 in FIG. 2 schematically represents the display of a multilevel program outline in the outline editor window of the preferred embodiment. Each statement 35 in the program outline is called a outline item. While the outline items 35 shown in FIG. 2 each occupy just one display line, longer outline items can occupy two or more display lines.

The terms "parent", "child", "children", "siblings", and "descendants" are used herein to refer to related outline items at different levels in a multilevel program outline. Children outline items are outline items at a lower outline level than their parent. The term "siblings" refers to a set of outline items with a common parent item. The terms "child", "children" and "siblings" are herein used only to refer to the outline items at the next lower outline level than their parent unless otherwise specified. The term "descendants", however, refers to all of the outline items at all outline levels below (i.e., descended from) a specified parent item.

For ease of reference, the text of outline items in FIG. 2 are labels instead of the text of an actual program.

Using standard outline indentation form, the "topmost" level of the outline comprises those items which are not indented. The next "lower" outline level, also called the second outline level, comprises items which are indented just once. The third level comprises items which are doubly indented, an so on. There is no limit to the number of outline levels which can be used. In FIG. 2, the topmost outline level comprises items ITEM I, ITEM II and ITEM III. The second level items descending from ITEM I are ITEM I-A, ITEM I-B, and ITEM I-C, and the second level items descending from ITEM III are ITEM III-A. Third level items descending from ITEM I-B are ITEM I-B-1, and third level items descending from ITEM I-C are ITEM I-C-1, ITEM I-C-2 and ITEM I-C-3.

Due to the standard top to bottom arrangement of written outlines, the following terminology is used herein regarding outline levels. Each "lower" level of an outline has an ordinal level "number" (e.g., the third level) which is one higher than the next higher level, and a "higher" outline level has a lower ordinal level number than its descendants.

Outline Expansion and Contraction

As shown in FIG. 2, a visible or displayed expansion flag 36 is located in front of each outline item. The purpose of the expansion flag 36 is to cue the user as to whether there are children items which can be viewed by expanding its parent. Thus the displayed expansion flag 36 has two visual states: EXPANDABLE (a filed diamond, indicating that the outline item has children) and NOT_EXPANDABLE (the outline of a diamond, indicating that the outline item has no children).

A shown in FIG. 2, an outline item's children also have displayed expansion flags. Thus, when the user commands that a selected outline item be expanded, the user is given the option of performing a simple expansion, so as to view only the selected outline item's children, or performing a full expansion so as to view of all the selected outline item's descendants.

Figure 3:
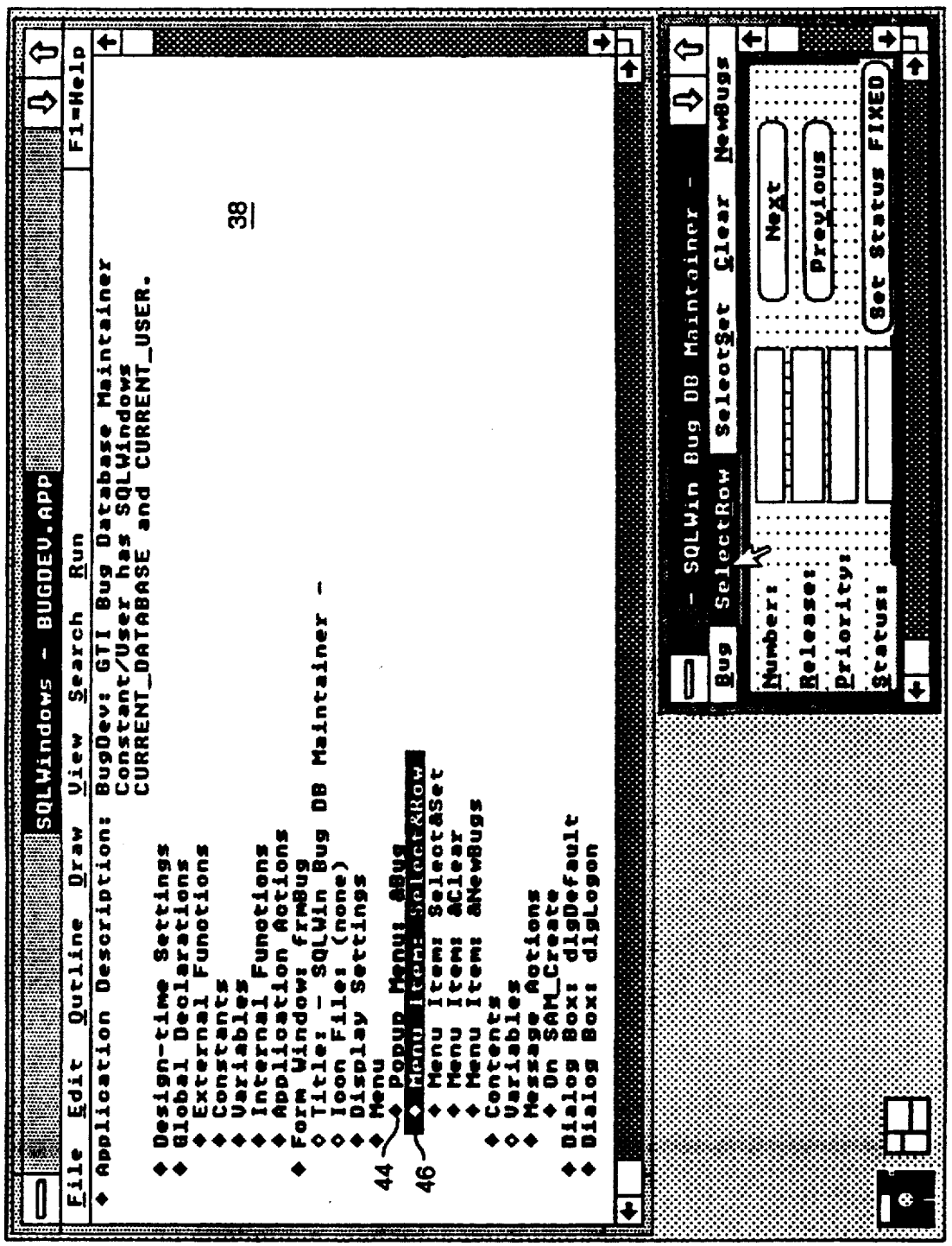
FIG. 3 shows a program outline.
Figure 4:
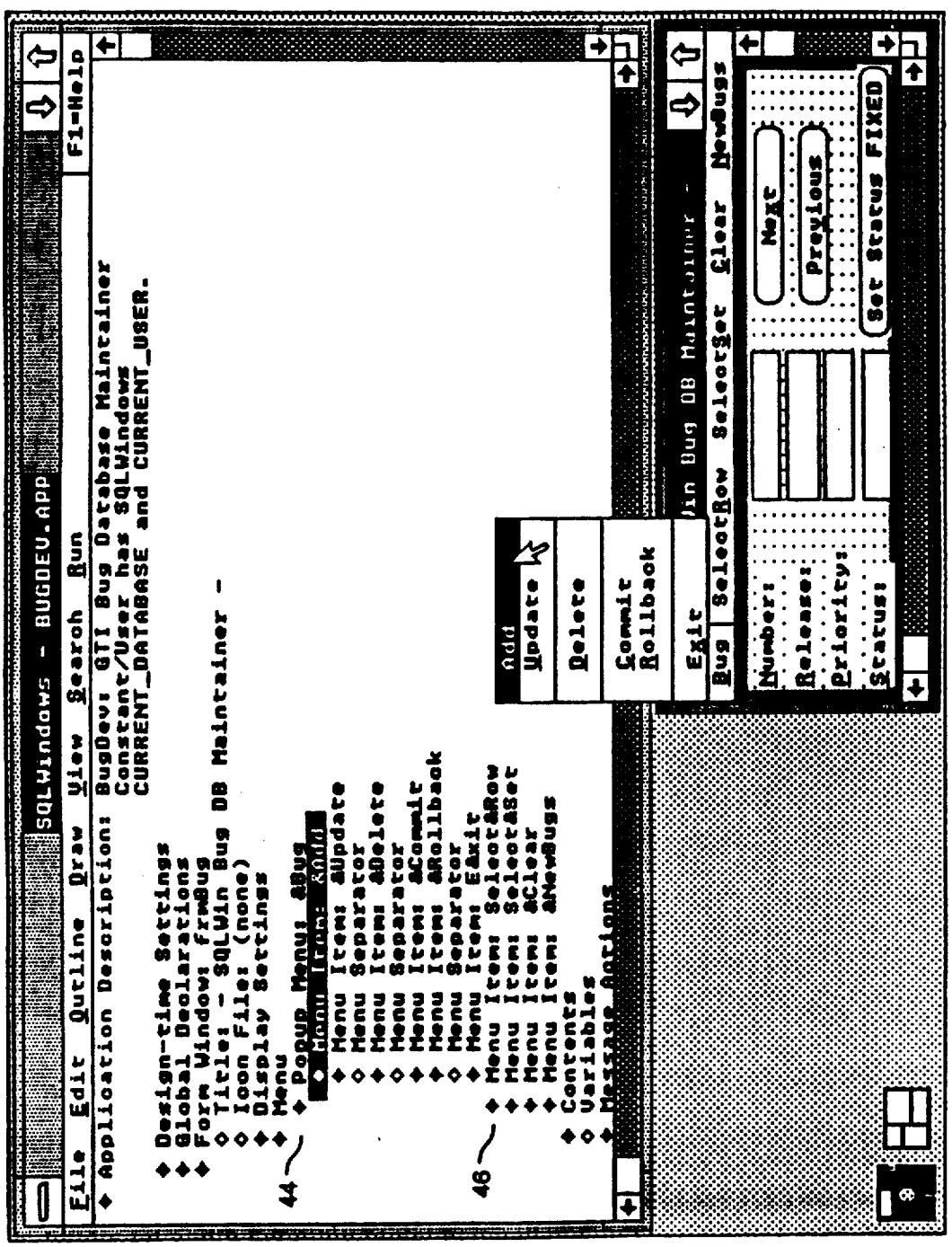
FIGS. 4 and 5 show expanded views of the same program outline.
Figure 5:
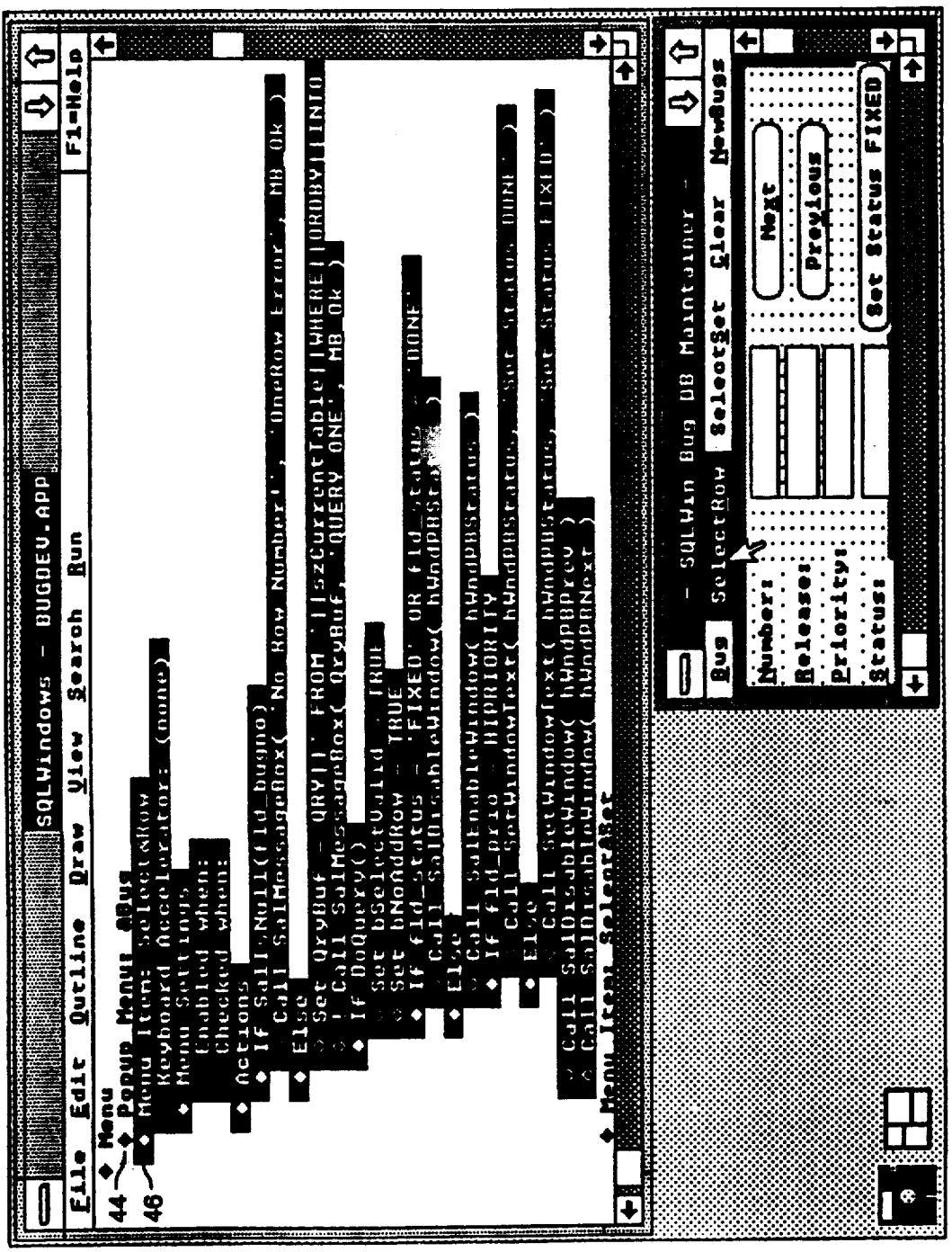

FIGS. 3-5 demonstrate the principle of progressive disclosure, showing a sequence of program outline displays generated by the outline editor as selected expansion flags are enabled. FIG. 3 shows the displayed outline of an exemplary computer program named BUG-DEV.APP. The visual program object associated with the outline item "Form Window: frmBug" is shown in Window 38.

FIG. 4 shows the displayed outline of the same program after the outline item "Popup Menu: &Bug" 44 is expanded one outline level. Similarly, FIG. 5 shows the outline display after the outline item "Popup Menu: Select&Row" 46 in FIG. 3 is fully expanded so as to show all descendants of the selected outline item 46.

Outline Structure and Data Structures

As discussed above with reference to FIG. 1, each computer program generated through the use of development software 29 is internally represented by an outline data structure 30.

Figure 6:
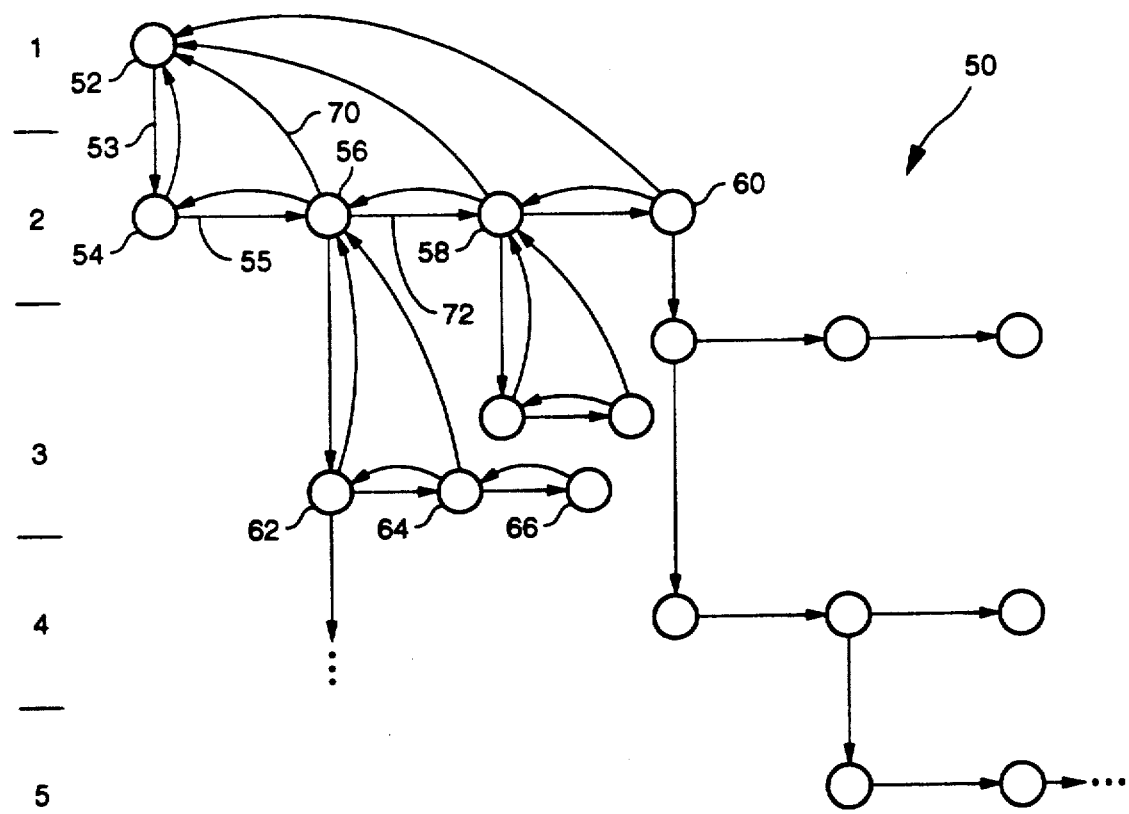
FIG. 6 schematically depicts the relationships between the data structures representing a computer program.

Referring to FIG. 6, the outline data structure 30 for a computer program is conceptually a tree 50 of interconnected nodes, herein called items or outline items. The tree 50 (i.e., computer program) has a root node 52 from which all the other nodes (i.e., outline items) are descended via branches, such as branches 53 and 55 coupling the root 52 to items 54, 56, 58, 60 and so on. All of the items (e.g., 62, 64 and 66) coupled to a single downward branch (e.g., 68) are the children of the parent item at the top of the downward branch. Thus items 62, 64 and 66 are children of the item 56 and items 54, 56, 58 and 60 are children of the root node 52. As shown in FIG. 6, the children of a particular outline item are represented by a doubly linked list, i.e., with both forward and backward pointers.

FIG. 6 shows the four types of "branches" or pointers used in the preferred embodiment to interconnect the outline items in a computer program. Using item 56 as an example, item 56 has four pointers which connect it to related outline items: first child pointer 68, which points to first child 62; parent pointer 70, which points to the parent of 52 item 56; next sibling pointer 72, which points to the next sibling 58 in the linked list of children descending from the item's parent 52; and previous sibling pointer 55, which points to the previous sibling 54 in the linked list of children descending from the item's parent 52.

Figure 7:
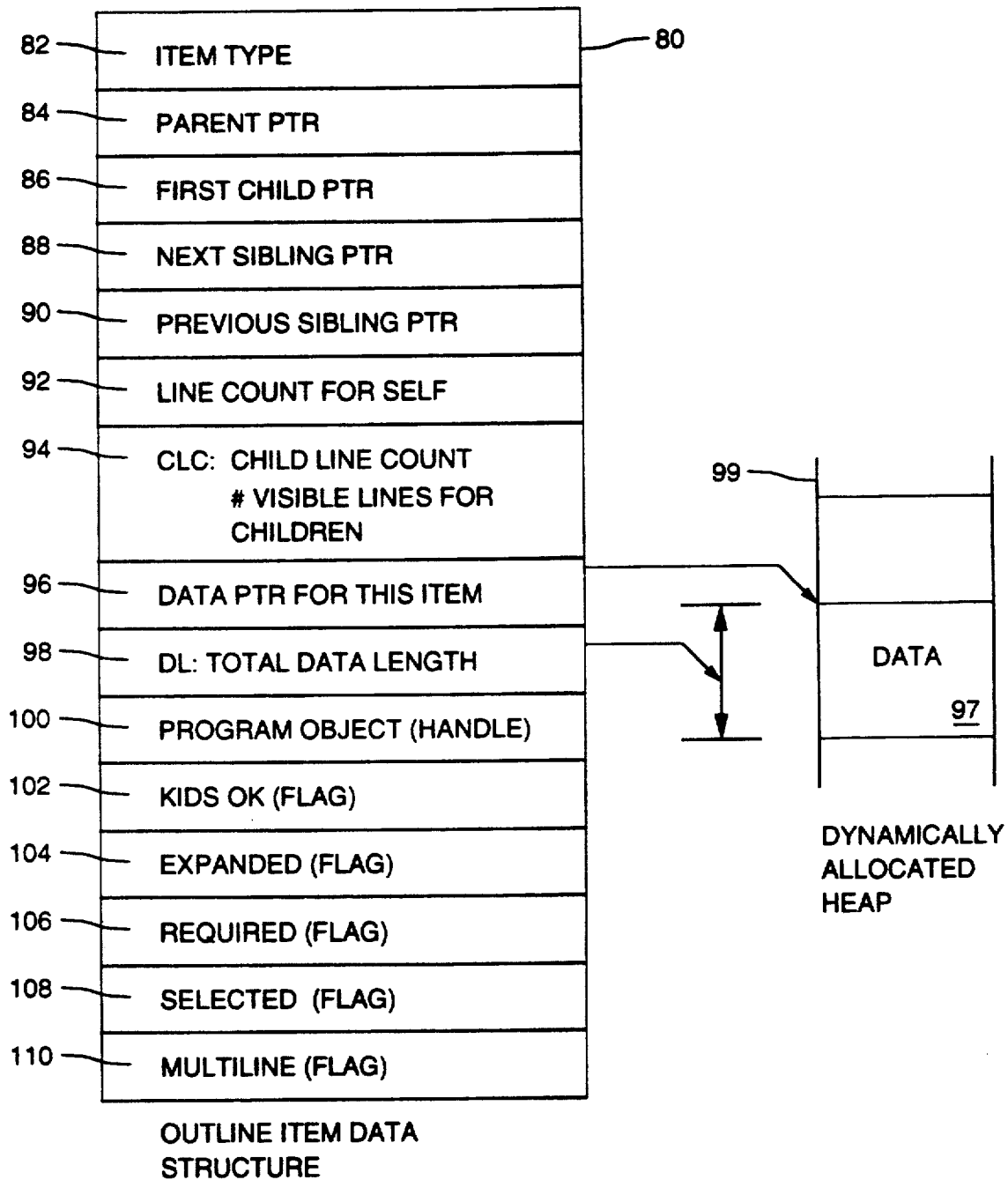
FIG. 7 represents the data structure representing a single outline item.

Item Data Structure. FIG. 7 shows the detailed data structure 80 used to represent each outline item in a computer program. That is, for every outline item in a computer program, there is stored a set of information, formatted as shown in FIG. 7, with information denoting the function and context of the outline item.

The following information is stored in the data structure 80 representing each outline item. The ITEM TYPE 82 specifies the function or type of the outline item, such as whether the outline item specifies a Form Window, Pop Up Menu, Subroutine, or an If statement in a program. Item types are discussed in more detail below.

PARENT PTR 84 is a pointer to the parent of the outline item (e.g., pointer 70 in FIG. 6). That is, it is a pointer to the data structure representing the parent of this outline item. If this outline item is the root item for the entire program, then the PARENT PTR has a null value, indicating that this is the root item.

FIRST CHILD PTR 86 is a pointer to the first child of the outline item (e.g., pointer 68 in FIG. 6). NEXT SIBLING PTR 88 and PREVIOUS SIBLING PTR 90 are pointers which form a doubly linked list of sibling outline items, as described above with reference to FIG. 6.

LINE COUNT FOR SELF 92 is the number of physical lines required to display this item. For some outline items, this value depends on parameter values stored in the data blocks 97 (described below) for the item. For instance, the data for an "IF" statement (i.e., outline item) specifies a logical condition. Since there is virtually no limit on the length of the text for that logical condition, the number of lines required to display "IF" statement items depends on the data associated with the item.

CHILD LINE COUNT (CLC) 94 is the number of visible display lines associated with the children of the current item. If the current item is collapsed, CLC is equal to zero. Otherwise, CLC is equal to sum of the LINE COUNT FOR SELF values for all of the descendants of the current item which have been enabled for display. Together, LINE COUNT FOR SELF and CHILE LINE COUNT are used to facilitate the visual display of program outlines.

DATA PTR 96 points to a data block 97 for the current item and TOTAL DATA LENGTH (DL) 98 represents the size or length of that data block. A data block 97 is simply an allocated block of memory which stores the parameter value(s) for a particular outline item. For instance, the data block for a "menu item" stores text to be displayed when the associated menu is displayed. Other outline items require numerical data, such as position of a box or window on the computer's display.

PROGRAM OBJECT 100 specifies a "window handle" corresponding to the item, if any. This handle is a reference value generated by Windows, which enables the program to instruct Windows to generate a window containing a particular program object when this outline item is called or executed.

Five binary flags 102-110 are used to facilitate the fast processing of program outlines. KIDS OK 102 is True if an outline item is allowed to have descendants, as will be explained below, and is False if no descendants are allowed. The EXPANDED flag 104 is True if the display of this item's children has been enabled, and is False otherwise.

The REQUIRED flag 106 is True if the outline item has "required children", as explained below.

The SELECTED flag 108 is True when the user selects the outline item for some operation, such as editing the item, or toggling its EXPANDED flag.

The MULTILINE flag 110 is True if the outline item requires more than one line when displayed.

In summary, the data structures shown in FIG. 6 and 7 are used to completely represent a computer program in the form of a multilevel outline of program statements, herein called outline items. The multilevel outline is represented by a set of linked outline items, using sibling pointers to form linked lists of the outline items at each outline level, and parent and child pointers to link related items at adjacent outline levels.

Figure 8:
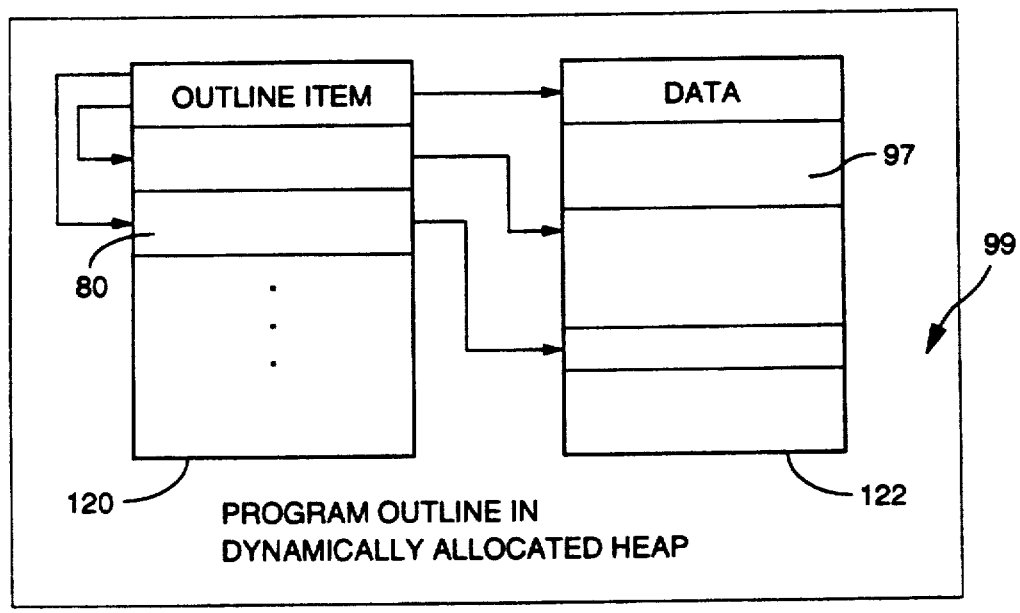
FIG. 8 depicts the dynamic allocation of memory storage for the data structures representing a computer program.

Dynamic Memory Allocation. Referring to FIG. 8, the memory space for a computer program is dynamically allocated as items are added to a program from a heap 99 of allocatable memory space. Each outline item has two components: a fixed length item data structure 80 and a variable length data block 97. In the preferred embodiment, the fixed length item data structures 80 are stored in a first portion 120 of the heap 99 while the variable length data blocks 97 are stored in second portion 122.

More generally, as new outline items are added to a program, space is dynamically allocated from the heap 99 for storing the corresponding item data structure and data block. When outline items are deleted, the corresponding memory space is given back to the heap, and when outline items are modified, space is reallocated as needed. The particular heap or dynamic memory allocation scheme used is not considered part of the present invention, and many such dynamic memory allocation schemes are commercially available and known to those skilled in the art.

Program Development

When new statements or objects are added to a computer program, a set of rules governs the use of the outline items added to the program outline. More particularly, a data structure called the Rules Table 31 (see FIG. 1) defines the format and characteristics of each type of outline item.

Figure 9:
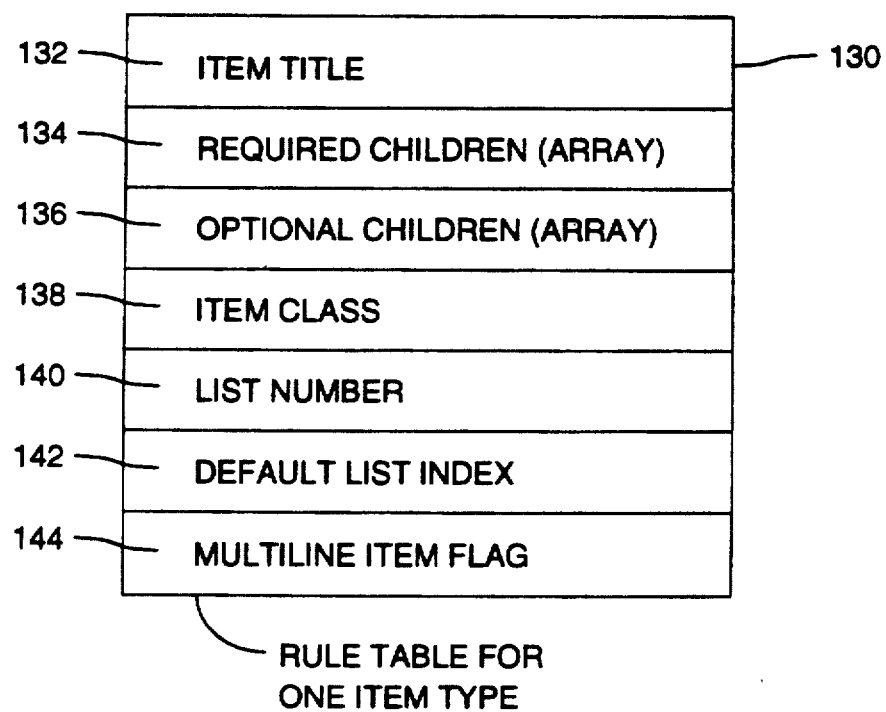
FIG. 9 represents the data structure of one Rule Table.

Rules Table. Referring to FIG. 9, the Rule Table 130 for each outline item type denotes several important characteristics or rules for items of that type. These rules limit and govern the usage of each item type, and also determine the structure of certain portions of the program.

The TITLE 132 is the text at the beginning of a displayed outline item.

Required Children 134 is a list of children items that must accompany items of this type, and which are automatically added to the program when items of the this type are created or added to a program. Optional Children 136 is a list of children items that may descend from items of this type. Item types not included in this list cannot be added as children to items of this type. In general, only one of each of the Required Children may descend from a particular instance of an item, but the number of Optional Children which may descend from an item is not limited.

Appendix 1 contains a partially listing of the Rules Tables (actually, the Item Title, Required Children and Optional Children) of a number of the item types used in the preferred embodiment of the invention.

The ITEM CLASS 138 is a value which indicates classes of changeable item types. That is, when editing an outline item, the user change the type of an outline item while retaining the parameters associated with the item. The ITEM CLASS restricts the set of outline item types to which an outline item may be changed. For instance, the set of "program statement items" such as SET, IF, ELSE, CALL and LOOP are in one Item Class, while the set of "variable type declaration statements" such as BOOLEAN, FILE, STRING, and NUMBER are in a different Item Class.

For some item types, parameters for the item are selected from a limited set of possible values, herein called a List. The LIST NUMBER 140 is a pointer to the List of allowable parameter values associated with this item type, if any. For instance, some outline items have a parameter value equal to YES or NO. Such item types generally must have default value. DEFAULT LIST INDEX 142 specifies such a default value by providing an index or pointer into the List specified by LIST NUMBER 140. This point designates one of the values in the List as the default value for this item type.

The MULTILINE ITEM FLAG 144 indicates whether items of this item type may occupy more than one display line. Whenever an item of this type is created, the value of this flag copied into the MULTILINE flag 110 for that item.

Figure 10:
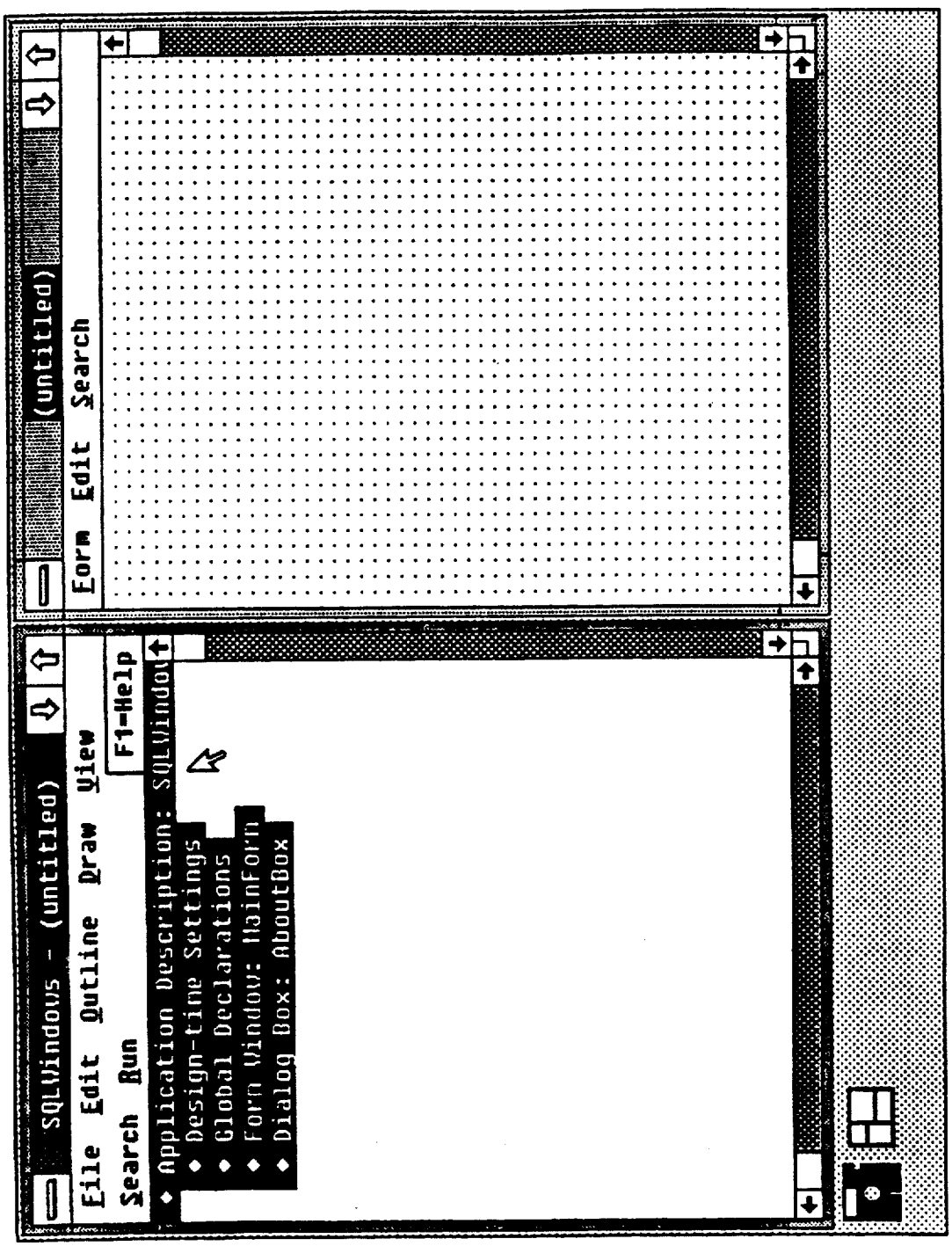
FIG. 10 depicts an initial program outline generated when a new outline program is created.

Initial New Program Outline When a new program is first defined, an initial program outline is automatically generated. A collapsed view of the initial program outline provided in the preferred embodiment is shown in FIG. 10. The root node of all programs, called the Application Description 150, is used by the programmer as a "headnote" that may state the title of the program and other such information. Design-time Settings 152 and Global Declarations 154 are required children of the Application Description outline item 150.

The Design-time Settings 152 specifies the locations of the windows used to edit the program and the location of the options window 34 mentioned above with respect to FIG. 1. Global Declarations 154 has its own required children for specifying the external function, constants, variables, internal function and application actions to be used in the program.

Form Window 156 and Dialog Box 158 are optional children of the Application Description outline item 150. Even though these are optional children, they are included in the initial program outline when a new program is created because they are needed in virtually all programs.

In the preferred embodiment, the initial program outline contains more than a thousand outline items, due to the large library of predefined functions as well as many predefined constants and variables in the default Global Declarations, plus the initial Form Window and Dialog Box. Appendix 2 contains a partially expanded listing of the initial program. Appendix 3 contains an partially expanded listing of an example of a database maintenance program with a Form Window for accessing the database, corresponding to the program shown in FIG. 12.

Adding New Program Statements and Objects. As the program is written, the programmer adds objects and program statements to the outline. When a new program object, such as a menu or form window is added to a program, a set of outline items is added to the program outline, including the outline item corresponding to the added object and all of its required children. For instance, referring to Appendix 1, when a Form Window object is added to a program, the following require children are automatically added to the program: Window Title, Icon File, Form Window Options, Menu, Form Contents, Variables, On Actions. Some of these items, such as the Menu item, also have required children which are also automatically inserted into the program.

Figure 11:
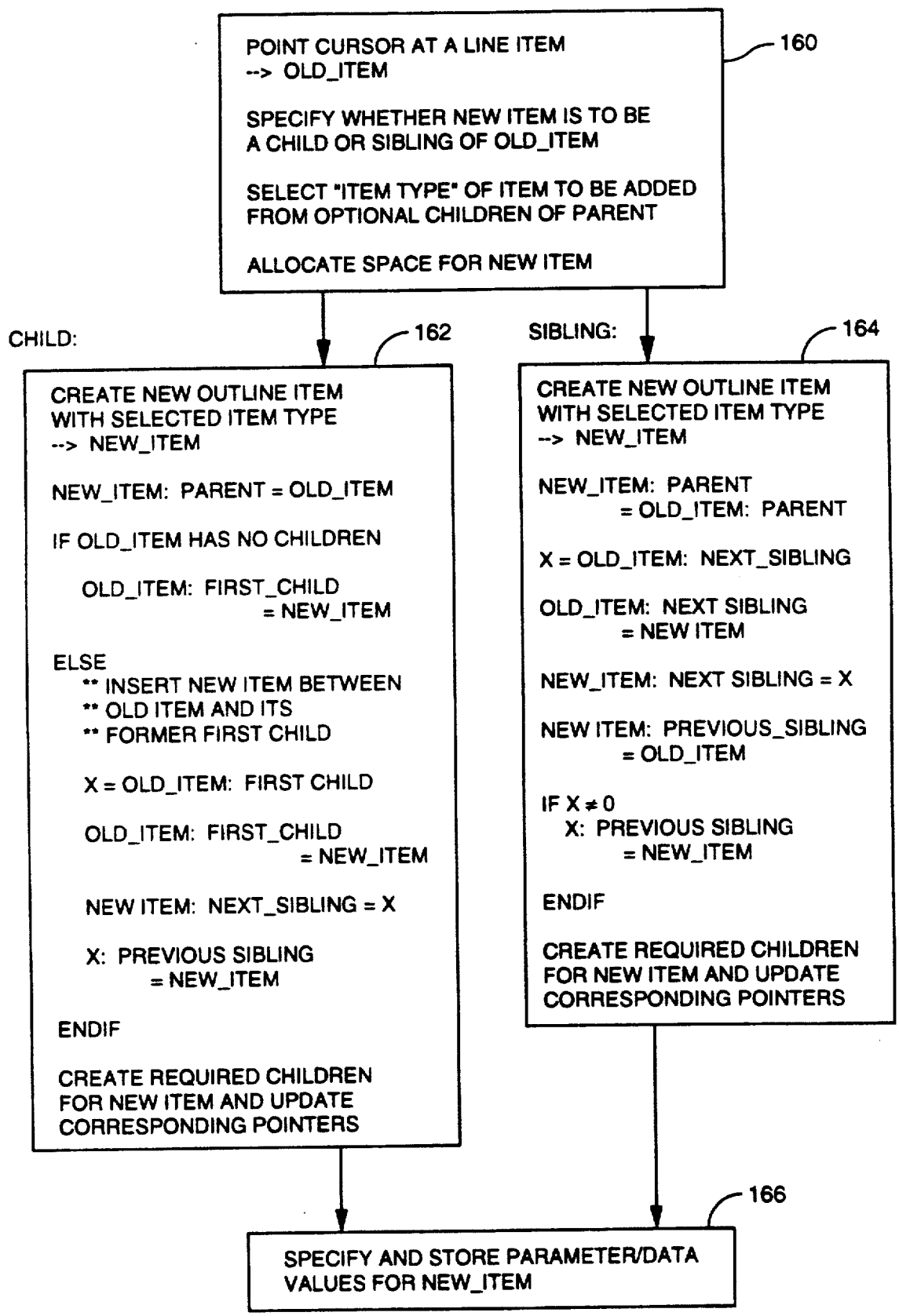
FIG. 11 depicts a flowchart of the process for adding a new object or outline item to a program.

Referring to FIG. 11, the process for adding any new outline item to a program outline is as follows. First (box 160), the user or programmer selects the position in the program outline that the new outline item is to be added by positioning a cursor on the display screen at the point that the item is to be added. The programmer must also specify the type of object or outline item that is to be added, and also whether the new outline item is to be added as a child or a sibling to the outline item being pointed to by the cursor. As explained above, the set of item types that may be added at any particular point in a program is defined by the Rule Table for the parent of the outline item being added to the program. The list of Optional Children allowed by the parent item can be viewed by the programmer in the Options Box 34 (see FIG. 2).

When the new item type has been selected, space is allocated for the data structure representing the new item, and the selected data type is stored as the ITEM TYPE 82 (see FIG. 7).

It should be noted that the selection of whether the new item is to be the sibling or child of the item being pointed at determines the range of allowed item types, because the sibling/child selection identifies the parent of the new item, and the rules table corresponding to the parent item specifies the allowed children of that parent item.

Next, the newly selected outline item is linked into the outline representing the computer program. This means that the PARENT PTR, NEXT SIBLING PTR, AND PREVIOUS SIBLING PTR for the new item are assigned values that designate the item's placement in the program.

If the new item is the first child of its parent (box 162) then the FIRST CHILD PTR in the parent is updated. If there are additional children (i.e., siblings), then the PREVIOUS SIBLING PTR of the parent's next sibling must also be updated so as to point to the newly added item.

If the new item is not the first child of its parent (box 164) the pointers of the siblings before and after the newly added item must be updated so as to add the newly added item into the doubly linked list of siblings. More particularly, the NEXT SIBLING PTR of the sibling item before the newly added item must be updated to point to the newly added item, and the PREVIOUS SIBLING PTR of the sibling item after the newly added item (if any) must also be updated to point to the newly added item.

In additional, all required children of the newly added item are automatically added to the program outline (boxes 162 and 164).

Finally, the user specifies the parameter or data values for the newly added outline item (box 166).

For the purposes of prototyping, the user may add program object (i.e., outline items) without fully specifying the parameters and children of that item. When the program is run, the user will be warned about incomplete and missing portions of the program, but will be allowed to proceed so that he can see how the initially prepared portions of the program work. Thus the outline structure of the program and the accompanying rules encourage "top down" programming and prototyping.

Generating Display Oriented Program Objects

Figure 12:
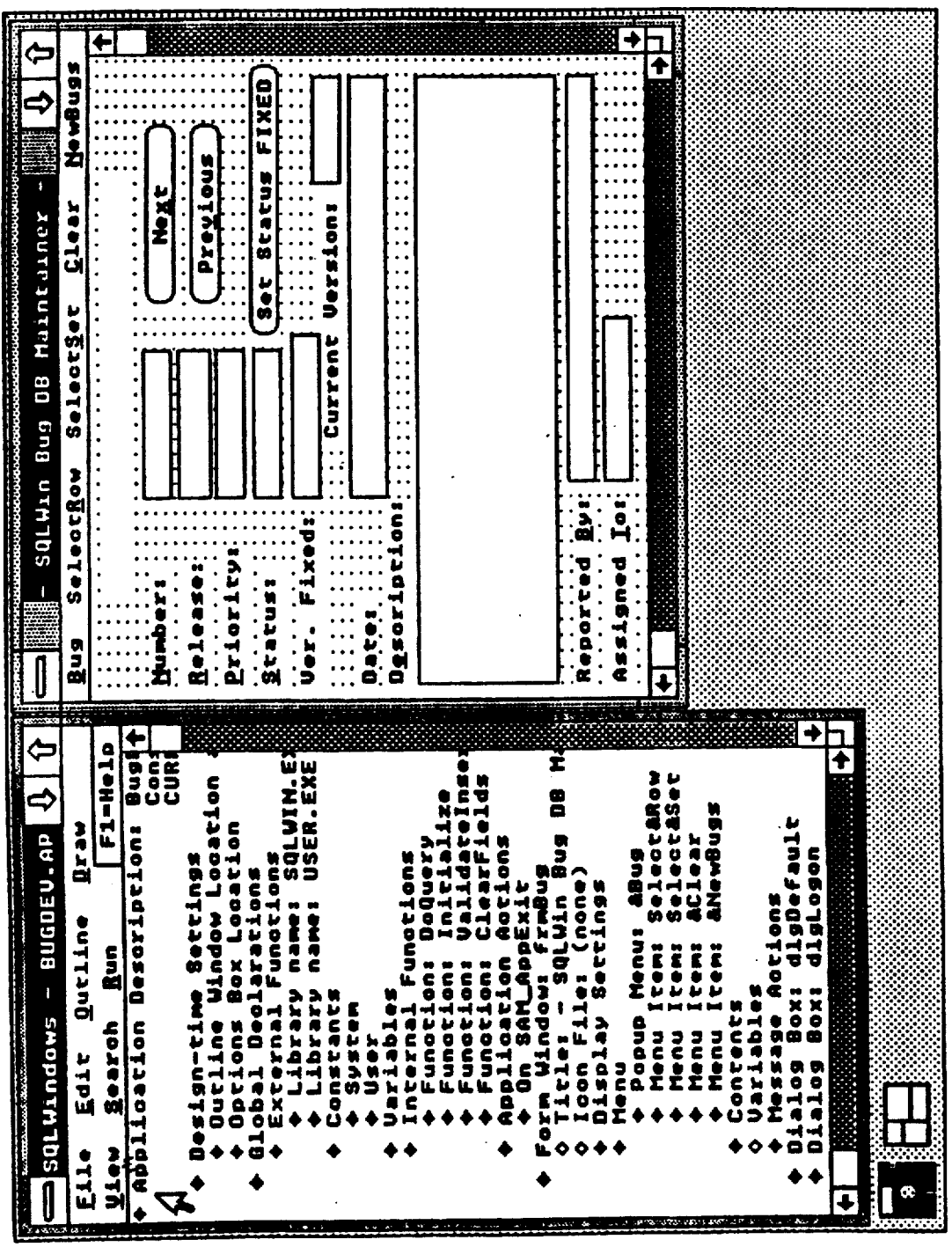
FIG. 12 shows a side by side views of a menu object as represented in both an outline editor window and a layout window.

Referring to FIG. 12, when a programmer specifies that the next item to be added to a program is a display oriented object, such as a Form Window, the system automatically generates and displays the object in a window called the layout window. The user then adds text, input boxes, and functions to the object by moving the layout window's cursor to an appropriate position, and selecting the test or item to be added.

Appendix 3 shows an expanded outline for the Form Window program object shown in FIG. 12. This Form Window is a program for maintaining and updating a database of records, each record having a set of editable data fields named Number, Release, Priority, Status, Ver. Fixed, Current Version, Date, Description, Reported By, and Assigned To. The data base also includes a number of data fields that are not "editable" by the user and can be seen in the listing in Appendix 3.

The steps for building the Form Window shown in FIG. 12 are as follows. First, the programmer defines the size and placement of the window which will contain the Form Window. Next, the programmer would probably set up each of the data fields (Number, Release, Priority, and so on) by indicating where on the form they are to be placed and the background text to be displayed adjacent to each data field entry box. These steps are performed using a graphic user interface that allows the programmer to specify the program object to be created, as well as the size and placement of its corresponding visual representation in the Form Window.

Next, the programmer might define the positions of the two PushButtons on the form, Next and Previous, which enable the user to quickly move back and forth through the records in a database.

Another set of items the programmer must define are the Popup Menus to be displayed along the menu bar near the top of the form. The relative positions of the Popup Menus as well as the user selectable options within each Popup Menu must be defined by the programmer.

Once the basic format of the Form Window is defined, the placements of the objects in the form window can be adjusted as necessary.

To each program object the programmer can then add the necessary program code so that appropriate actions are taken when new records are created, and when data in the records is modified or entered. In addition, the programmer must write program code to make the Popup Menus and the PushButtons perform their functions. The program code for the Popup Menus and PushButtons in the exemplary Form Window of FIG. 12 is shown in Appendix 3.

Automatic Outline Item Generation. As each feature of the Form Window in FIG. 12 is defined, or modified, the user interface automatically generates, or modifies corresponding outline items in the program outline. That is, the user interface generates and modifies outline items in the program outline data structure in response to the user's commands, regardless of whether those changes are made in the outline editor window or in the layout window.

The displayed program outline, and the displayed features of the Form Window, or other display oriented program object in the layout window are both representations of the same underlying data structure. Thus the outline items and the displayed object are inextricably linked by their common data structure, and changes in either window are immediately reflected in the other window.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

EXEMPLARY RULES TABLES

© Copyright 1987, 1988 Gupta Technologies, Inc.
All rights reserved.

```
Item        AppActions, 'Application Actions'
   OptKids
      Opt  OnMessage
EndItem Item        Application, 'Application Description:'
   Flags    <Multiline>
   Value    DT_TEXT
   ReqKids
      Req   DesignOptions
      Req   Globals
   OptKids
      Opt   DialogBox
      Opt   FormWindow
      Opt   TableWindow
EndItem Item        BooleanVar, 'Boolean:'
   Flags    <Multiline>
   Class    IC_Var
   Value    DT_TEXT
EndItem Item        CheckWhen, 'Checked when:'
   Flags    <Multiline>
   Value    DT_TEXT
EndItem Item        ColumnTitle, 'Title:'
   Value    DT_TEXT, DV_UNTITLED
EndItem Item        ColumnWidth, 'Width: '
   Value    DT_INT
EndItem Item        ColVisible, 'Visible?'
   Value    DT_LIST, DV_YES, DL_YESNO
EndItem Item        Constants, 'Constants'
   ReqKids
```

```
      Req    SystemConstants
      Req    UserConstants
EndItem

Item       DateTimeVar, 'Date/Time:'
  Flags    <Multiline>
  Class    IC_Var
  Value    DT_TEXT
EndItem Item       Description, 'Description:'
  Flags    <Multiline>
  Value    DT_TEXT
EndItem Item       DesignOptions, 'Design-time Settings'
      Req    OutlinePosition
      Req    OptionsPosition
EndItem Item       DesignVisible, 'Visible at Design time?'
  Value    DT_LIST, DV_YES, DL_YESNO
EndItem Item       DialogBox, 'Dialog Box:'
  Value    DT_TEXT, DV_UNNAMED
  ReqKids
    Req    WindowTitle
    Req    DialogWindowOptions
    Req    FormContents
    Req    Variables
    Req    OnActions
EndItem Item       DialogType, 'Type of Dialog:'
  Value    DT_LIST, DV_MODELESS, DL_DIALOG
EndItem Item       DialogWindowOptions, 'Display Settings'
  ReqKids
    Req    DesignVisible
    Req    DialogType
    Req    WindowPosition
    Req    AbsScreenLoc
EndItem Item       DoActions, 'Actions'
  OptKids
    Statements
EndItem Item       ElseIfStmt, 'Else If'
  Flags    <Multiline>
  Class    IC_Stmt
  Value    DT_TEXT
  OptKids
    Statements
EndItem Item       ElseStmt, 'Else'
  Class    IC_Stmt
  Value    DT_TEXT
  OptKids
    Statements
EndItem Item       EnableWhen, 'Enabled when:'
```

```
   Flags    <Multiline>
   Value    DT_TEXT
EndItem

Item       ExportOrdinal, 'Export Ordinal:'
   Value    DT_INT
EndItem

Item       ExtBoolean, 'Boolean:'
   Class    IC_ExtVar
   Value    DT_LIST, DV_EXT_BOOL, DL_EXT_BOOL
EndItem Item       ExtDateTime, 'Date/Time:'
   Class    IC_ExtVar
   Value    DT_LIST, DV_EXT_LONG, DL_EXT_NUMBER
EndItem Item       ExtFile, 'File Handle:'
   Class    IC_ExtVar
   Value    DT_LIST, DV_EXT_HFILE, DL_EXT_FILE
EndItem Item       ExtFunctions, 'External Functions'
   OptKids
      Opt   LibraryName
EndItem Item       ExtFunName, 'Function:'
   Value    DT_TEXT
   ReqKids
      Req   Description
      Req   ExportOrdinal
      Req   ExtReturns
      Req   ExtParameters
EndItem Item       ExtLongString, 'Long String:'
   Class    IC_ExtVar
   Value    DT_LIST, DV_EXT_HSTRING, DL_EXT_STRING
EndItem Item       ExtNumber, 'Number:'
   Class    IC_ExtVar
   Value    DT_LIST, DV_EXT_LONG, DL_EXT_NUMBER
EndItem Item       ExtParameters, 'Parameters'
   OptKids
      Opt   ExtBoolean
      Opt   ExtDateTime
      Opt   ExtFile
      Opt   ExtNumber
      Opt   ExtSqlHandle
      Opt   ExtString
      Opt   ExtTemplate
      Opt   ExtWindow
      Opt   ExtRetBoolean
      Opt   ExtRetDateTime
      Opt   ExtRetFile
      Opt   ExtRetNumber
      Opt   ExtRetSqlHandle
      Opt   ExtRetString
      Opt   ExtRetWindow
EndItem Item       ExtReturns, 'Returns'
   OptKids
```

```
   Opt     ExtBoolean
   Opt     ExtDateTime
   Opt     ExtFile
   Opt     ExtNumber
   Opt     ExtSqlHandle
   Opt     ExtString
   Opt     ExtWindow
   Opt     ExtTemplate
EndItem Item       ExtRetBoolean, 'Receive Boolean:'
   Class   IC_ExtVar
   Value   DT_LIST, DV_EXT_LPBOOL, DL_EXT_RETBOOL
EndItem Item       ExtRetDateTime, 'Receive Date/Time:'
   Class   IC_ExtVar
   Value   DT_LIST, DV_EXT_LPLONG, DL_EXT_RETNUMBER
EndItem Item       ExtRetFile, 'Receive File Handle:'
   Class   IC_ExtVar
   Value   DT_LIST, DV_EXT_LPHFILE, DL_EXT_RETFILE
EndItem Item       ExtRetLongString, 'Receive Long String:'
   Class   IC_ExtVar
   Value   DT_LIST, DV_EXT_HSTRING, DL_EXT_RETSTRING
EndItem Item       ExtRetNumber, 'Receive Number:'
   Class   IC_ExtVar
   Value   DT_LIST, DV_EXT_LPLONG, DL_EXT_RETNUMBER
EndItem Item       ExtRetSqlHandle, 'Receive Sql Handle:'
   Class   IC_ExtVar
   Value   DT_LIST, DV_EXT_LPSQL, DL_EXT_RETSQL
EndItem Item       ExtRetString, 'Receive String:'
   Class   IC_ExtVar
   Value   DT_LIST, DV_EXT_HSTRING, DL_EXT_RETSTRING
EndItem Item       ExtRetWindow, 'Receive Window Handle:'
   Class   IC_ExtVar
   Value   DT_LIST, DV_EXT_LPHWND, DL_EXT_RETWINDOW
EndItem Item       ExtSqlHandle, 'Sql Handle:'
   Class   IC_ExtVar
   Value   DT_LIST, DV_EXT_SQL, DL_EXT_SQL
EndItem Item       ExtString, 'String:'
   Class   IC_ExtVar
   Value   DT_LIST, DV_EXT_HSTRING, DL_EXT_STRING
EndItem Item       ExtTemplate, 'Template:'
   Class   IC_ExtVar
   Value   DT_LIST, DV_EXT_TEMPLATE, DL_EXT_TEMPLATE
EndItem Item       ExtWindow, 'Window Handle:'
   Class   IC_ExtVar
   Value   DT_LIST, DV_EXT_HWND, DL_EXT_WINDOW
EndItem
```

```
Item       FileVar, 'File Handle:'
  Value    DT_TEXT
EndItem

Item       FormContents, 'Contents'
  OptKids
    Opt    PictureWindow
    Opt    BkgdText
    Opt    CheckBox
    Opt    Field
    Opt    FormWindow
    Opt    GroupBox
    Opt    GroupMarker
    Opt    HorizScrollBar
    Opt    ListBox
    Opt    TableWindow
    Opt    MultilineText
    Opt    PushButton
    Opt    RadioButton
    Opt    VertScrollBar
EndItem Item       FormHeight, 'Height:'
  Value    DT_LIST, DV_DEFAULT, DL_DEFAULT
EndItem Item       FormPages, 'Number of Pages:'
  Value    DT_LIST, DV_DYNAMIC, DL_DYNAMIC
EndItem Item       FormSize, 'Form Size'
  ReqKids
    Req    FormWidth
    Req    FormHeight
    Req    FormPages
EndItem Item       FormWidth, 'Width: '
  Value    DT_LIST, DV_DEFAULT, DL_DEFAULT
EndItem Item       FormWindow, 'Form Window:'
  Value    DT_TEXT, DV_UNNAMED
  ReqKids
    Req    WindowTitle
    Req    IconFile
    Req    FormWindowOptions
    Req    Menu
    Req    FormContents
    Req    Variables
    Req    OnActions
EndItem Item       FormWindowOptions, 'Display Settings'
  ReqKids
    Req    DesignVisible
    Req    AutoCreate
    Req    InitState
    Req    Maximizable
    Req    Minimizable
    Req    Movable
    Req    Resizable
    Req    WindowPosition
    Req    FormSize
EndItem Item       FunctionCall, 'Call'
```

```
    Flags    <Multiline>
    Class    IC_Stmt
    Value    DT_TEXT
EndItem

Item        Globals, 'Global Declarations'
   ReqKids
      Req   ExtFunctions
      Req   Constants
      Req   Variables
      Req   IntFunctions
      Req   AppActions
EndItem Item        IconFile, 'Icon File:'
   Value    DT_TEXT, DV_NONE
EndItem Item        IfStmt, 'If'
   Flags    <Multiline>
   Class    IC_Stmt
   Value    DT_TEXT
   OptKids
      Statements
EndItem Item        IntFunctions, 'Internal Functions'
   OptKids
      Opt   IntFunName
EndItem Item        IntFunName, 'Function:'
   Value    DT_TEXT
   ReqKids
      Req   Description
      Req   IntReturns
      Req   IntParameters
      Req   IntLocals
      Req   DoActions
EndItem Item        IntLocals, 'Local variables'
   OptKids
      Opt   BooleanVar
      Opt   DateTimeVar
      Opt   FileVar
      Opt   LongStringVar
      Opt   NumberVar
      Opt   SqlHandleVar
      Opt   StringVar
      Opt   WindowVar
EndItem Item        IntParameters, 'Parameters'
   OptKids
      Opt   BooleanVar
      Opt   DateTimeVar
      Opt   FileVar
      Opt   LongStringVar
      Opt   NumberVar
      Opt   SqlHandleVar
      Opt   StringVar
      Opt   WindowVar
      Opt   RetBooleanVar
      Opt   RetDateTimeVar
      Opt   RetFileVar
      Opt   RetLongStringVar
```

```
    Opt    RetNumberVar
    Opt    RetSqlHandleVar
    Opt    RetStringVar
    Opt    RetWindowVar
EndItem Item       IntReturns, 'Returns'
  OptKids
    Opt    BooleanVar
    Opt    DateTimeVar
    Opt    FileVar
    Opt    LongStringVar
    Opt    NumberVar
    Opt    SqlHandleVar
    Opt    StringVar
    Opt    WindowVar
EndItem Item       KbdButton, 'Keyboard Accelerator:'
  Value    DT_LIST, 0, DL_KBDBUTTON
EndItem Item       KbdMenu, 'Keyboard Accelerator:'
  Value    DT_LIST, 0, DL_KBDMENU
EndItem Item       LibraryName, 'Library name:'
  Value    DT_TEXT
  OptKids
    Opt    ExtFunName
EndItem Item       LoopStmt, 'Loop'
  Class    IC_Stmt
  Value    DT_TEXT
  OptKids
    Statements
EndItem Item       Menu, 'Menu'
  OptKids
    Opt    MenuItem
    Opt    PopupMenu
    Opt    MenuRow
EndItem Item       MenuColumn, 'Menu Column'
EndItem Item       MenuItem, 'Menu Item:'
  Value    DT_TEXT, DV_UNTITLED
  ReqKids
    Req    KbdMenu
    Req    MenuOptions
    Req    DoActions
EndItem Item       MenuOptions, 'Menu Settings'
  ReqKids
    Req    EnableWhen
    Req    CheckWhen
EndItem Item       MenuRow, 'Menu Row'
EndItem Item       MenuSeparator, 'Menu Separator'
EndItem
```

```
Item       Minimizable, 'Minimizable?'
  Value    DT_LIST, DV_YES, DL_YESNO
EndItem Item       ModalDialog, 'Modal Dialog?'
  Value    DT_LIST, DV_NO, DL_YESNO
  ReqKids
    Req    SystemModal
EndItem Item       Movable, 'Movable?'
  Value    DT_LIST, DV_YES, DL_YESNO
EndItem Item       MultilineData, 'Data'
  ReqKids
    Req    DataType
    Req    Editable
EndItem Item       NumberVar, 'Number:'
  Flags    <Multiline>
  Class    IC_Var
  Value    DT_TEXT
EndItem Item       OnActions, 'Message Actions'
  OptKids
    Opt    OnMessage
EndItem Item       OnMessage, 'On'
  Value    DT_TEXT
  OptKids
    Statements
EndItem Item       OnSqlError, 'On'
  Class    IC_Stmt
  Value    DT_LIST, DV_SQLERROR, DL_ONSTMT
  OptKids
    Statements
EndItem Item       OptionsPosition, 'Options Box Location'
  ReqKids
    Req    Visible
    Req    WindowLeft
    Req    WindowTop
EndItem Item       OutlinePosition, 'Outline Window Location and Size'
  ReqKids
    Req    WindowLeft
    Req    WindowTop
    Req    WindowWidth
    Req    WindowHeight
EndItem Item       PopupMenu, 'Popup Menu:'
  Value    DT_TEXT, DV_UNTITLED
  OptKids
    Opt    MenuItem
    Opt    MenuSeparator
    Opt    MenuColumn
EndItem
```

```
Item       PushButton, 'Pushbutton:'
  ReqKids
    Req    WindowTitle
    Req    WindowPosition
    Req    KbdButton
    Req    OnActions
EndItem Item       Remark, '|'
  Flags    <Multiline>
  Value    DT_TEXT
EndItem Item       ReturnStmt, 'Return'
  Flags    <Multiline>
  Class    IC_Stmt
  Value    DT_TEXT
  OptKids
    Statements
EndItem Item       RetBooleanVar, 'Receive Boolean:'
  Class    IC_Var
  Value    DT_TEXT
EndItem Item       RetDateTimeVar, 'Receive Date/Time:'
  Class    IC_Var
  Value    DT_TEXT
EndItem Item       RetFileVar, 'Receive File Handle:'
  Class    IC_Var
  Value    DT_TEXT
EndItem Item       RetLongStringVar, 'Receive Long String:'
  Class    IC_Var
  Value    DT_TEXT
EndItem Item       RetNumberVar, 'Receive Number:'
  Class    IC_Var
  Value    DT_TEXT
EndItem Item       RetSqlHandleVar, 'Receive Sql Handle:'
  Class    IC_Var
  Value    DT_TEXT
EndItem Item       RetStringVar, 'Receive String:'
  Class    IC_Var
  Value    DT_TEXT
EndItem Item       RetWindowVar, 'Receive Window Handle:'
  Class    IC_Var
  Value    DT_TEXT
EndItem Item       SetStmt, 'Set'
  Flags    <Multiline>
  Class    IC_Stmt
  Value    DT_TEXT
  OptKids
    Statements
EndItem
```

```
Item      SqlHandleVar, 'Sql Handle:'
  Class   IC_Var
  Value   DT_TEXT
EndItem Item      StringVar, 'String:'
  Flags   <Multiline>
  Class   IC_Var
  Value   DT_TEXT
EndItem Item      Structure, 'Structure:'
  Class   IC_Var
  OptKids
    Opt   BooleanVar
    Opt   DateTimeVar
    Opt   NumberVar
    Opt   SqlHandleVar
    Opt   StringVar
    Opt   Structure
    Opt   WindowVar
EndItem Item      SystemConstants, 'System'
  OptKids
    Opt   BooleanVar
    Opt   DateTimeVar
    Opt   NumberVar
    Opt   StringVar
EndItem Item      UserConstants, 'User'
  OptKids
    Opt   BooleanVar
    Opt   DateTimeVar
    Opt   NumberVar
    Opt   StringVar
EndItem Item      Variables, 'Variables'
  OptKids
    Opt   BooleanVar
    Opt   DateTimeVar
    Opt   FileVar
    Opt   LongStringVar
    Opt   NumberVar
    Opt   SqlHandleVar
    Opt   StringVar
    Opt   WindowVar
EndItem Item      VertScroll, 'Vertical Scroll?'
  Value   DT_LIST, DV_YES, DL_YESNO
EndItem Item      Visible, 'Visible?'
  Value   DT_LIST, DV_NO, DL_YESNO
EndItem Item      WindowHeight, 'Height:'
  Value   DT_LIST, DV_DEFAULT, DL_DEFAULT
EndItem Item      WindowLeft, 'Left: '
  Value   DT_LIST, DV_DEFAULT, DL_DEFAULT
EndItem
```

```
Item       WindowPosition, 'Window Location and Size'
  ReqKids
    Req    WindowLeft
    Req    WindowTop
    Req    WindowWidth
    Req    WindowHeight
EndItem Item       WindowTitle, 'Title:'
  Value    DT_TEXT, DV_UNTITLED
EndItem Item       WindowTop, 'Top:    '
  Value    DT_LIST, DV_DEFAULT, DL_DEFAULT
EndItem Item       WindowVar, 'Window Handle:'
  Value    DT_TEXT
EndItem Item       WindowWidth, 'Width: '
  Value    DT_LIST, DV_DEFAULT, DL_DEFAULT
EndItem
```

APPENDIX 2

INITIAL PROGRAM OUTLINE

© Copyright 1987, 1988 Gupta Technologies, Inc.
All rights reserved.

```
Application Description: SQLWindows version 1.0
  Design-time Settings
    Outline Window Location and Size
      Left:   0.025"
      Top:    0.033"
      Width:  3.975"
      Height: 5.167"
    Options Box Location
      Visible? No
      Left:   Default
      Top:    Default
  Global Declarations
    External Functions
      Library name: SQLWIN.EXE
        Function: SalAbort
          Description: Halt the application.
            bOK = SalAbort( nExitCode )
          Export Ordinal: 32
          Returns
            Boolean: BOOL
          Parameters
            Number: INT
        Function: SalArrayAvg
          Description: Return the average of an array.
            nAvg = SalArrayAvg( hArray )
          Export Ordinal: 132
          Returns
            Number: NUMBER
          Parameters
            Number: HARRAY
        Function: SalArrayMax
        Function: SalArrayMin
        Function: SalArraySum
        Function: SalBreakFormWindowHandle
```

Function: SalBreakItemWindowHandle
    .
    .
    .
Function: SalStrUpper
   Description: Convert lower case letters in a string to upper case.
      nLength = SalStrUpper( strSource, strTarget )
   Export Ordinal: 148
   Returns
      Number: INT
   Parameters
      String: LPSTR
   Receive String: LPSTR Constants
  System
    ! Standard Boolean constants
    Boolean: FALSE = 0
    Boolean: TRUE = 1
    ! SAM messages
    Number: SAM_AnyEdit          = 0x2004
    Number: SAM_AppExit          = 0x2002
        .
        .
        .
    Number: SAM_SqlError         = 0x2003
    ! DDE messages
    Number: WM_DDE_First         = 0x03E0
    Number: WM_DDE_Initiate      = WM_DDE_First + 0
    Number: WM_DDE_Terminate     = WM_DDE_First + 1
        .
        .
        .
    Number: WM_DDE_Execute       = WM_DDE_First + 8
        .
        .
        .
    ! iCurrency Formats
    Number: FMT_Prefix_NoSeparation = 0
    Number: FMT_Suffix_NoSeparation = 1
    Number: FMT_Prefix_Separation   = 2
    Number: FMT_Suffix_Separation   = 3
    ! iDate Formats
    Number: FMT_Date_MDY = 0
    Number: FMT_Date_DMY = 1
    Number: FMT_Date_YMD = 2
    ! iTime Formats
    Number: FMT_Time_12Hour = 0
    Number: FMT_Time_24Hour = 1
    ! Validate Options
    Number: FMT_Validate_None = 0
    Number: FMT_Validate_Dialog = 1
    ! SalForm... constants
    Number: FORM_nFormWidth  = 1
    Number: FORM_nFormHeight = 2
    Number: FORM_nFormPages  = 3
  User
Variables
  Window Handle: hWndNULL
  Window Handle: hWndForm
  Window Handle: hWndItem
  Number: wParam
  Number: lParam
  ! Database name: default = DEMO
  ! String: SqlDatabase(8)
  ! Authorization name: default = SYSADM
  ! String: SqlUser(8)
  ! Password: default = SYSADM

```
  | String: SqlPassword(18)
  Internal Functions
  Application Actions
Form Window: MainForm
  Title:
  Icon File:
  Display Settings
    Visible at Design time? Yes
    Automatically Created at Runtime? Yes
    Initial State: Normal
    Maximizable? Yes
    Minimizable? Yes
    Movable? Yes
    Resizable? Yes
    Window Location and Size
      Left:   4.025"
      Top:    0.033"
      Width:  3.95"
      Height: 5.167"
    Form Size
      Width:  Default
      Height: Default
      Number of Pages: Dynamic
  Menu
    Popup Menu: &Form
      Menu Item: &New
        Keyboard Accelerator: (none)
        Menu Settings
          Enabled when:
          Checked when:
        Actions
      Menu Separator
      Menu Item: E&xit
        Keyboard Accelerator: (none)
        Menu Settings
          Enabled when:
          Checked when:
        Actions
          Call SalQuit()
      Menu Item: A&bout...
        Keyboard Accelerator: (none)
        Menu Settings
          Enabled when:
          Checked when:
        Actions
          Call SalModalDialog( AboutBox, hWndForm )
    Popup Menu: &Edit
      Menu Item: &Undo
        Keyboard Accelerator: Alt+BkSp
        Menu Settings
          Enabled when: SalEditCanUndo()
          Checked when:
        Actions
          Call SalEditUndo()
      Menu Separator
      Menu Item: Cu&t
        Keyboard Accelerator: Shift+Del
        Menu Settings
          Enabled when: SalEditCanCut()
          Checked when:
        Actions
          Call SalEditCut()
      Menu Item: &Copy
        Keyboard Accelerator: Ctrl+Ins
        Menu Settings
          Enabled when: SalEditCanCut()
          Checked when:
        Actions
```

```
            Call SalEditCopy()
      Menu Item: &Paste
        Keyboard Accelerator: Shift+Ins
        Menu Settings
            Enabled when: SalEditCanPaste()
            Checked when:
        Actions
            Call SalEditPaste()
      Menu Item: C&lear
        Keyboard Accelerator: Del
        Menu Settings
            Enabled when: SalEditCanCut()
            Checked when:
        Actions
            Call SalEditClear()
    Popup Menu: &Search
  Contents
  Variables
  Message Actions
Dialog Box: AboutBox
  Title:
  Display Settings
    Visible at Design time? No
    Type of Dialog: Modal
    Window Location and Size
        Left:    2.175"
        Top:     1.578"
        Width:   3.125"
        Height:  1.567"
    Absolute Screen Location? No
  Contents
    Background Text: SQLWindows
      Window Location and Size
        Left:    0.188"
        Top:     0.178"
        Width:   2.6"
        Height:  0.167"
      Justify: Center
    Background Text: Sample "About" Box
      Window Location and Size
        Left:    0.188"
        Top:     0.489"
        Width:   2.6"
        Height:  0.167"
      Justify: Center
    Pushbutton: ButtonOK
      Title: OK
      Window Location and Size
        Left:    0.888"
        Top:     0.922"
        Width:   1.2"
        Height:  0.289"
      Keyboard Accelerator: Enter
      Message Actions
        On SAM_Click
            Call SalEndDialog( hWndForm, 0 )
  Variables
  Message Actions
```

APPENDIX 3

PROGRAM OUTLINE FOR FORM WINDOW IN FIGURE 12

© Copyright 1987, 1988 Gupta Technologies, Inc.
All rights reserved.

Application Description: BugDev: GTI Bug Database Maintainer
  Constant/User has SQLWindows
  CURRENT_DATABASE and CURRENT_USER.
  Design-time Settings
    Outline Window Location and Size
      Left:   0.025"
      Top:    0.033"
      Width:  3.375"
      Height: 5.183"
    Options Box Location
      Visible? No
      Left:   3.5"
      Top:    3.85"
  Global Declarations
    External Functions
      Library name: SQLWIN.EXE
        Function: SalClearField
          Description: Clears a field.
          Export Ordinal: 30
          Returns
            Boolean: BOOL
          Parameters
            Window Handle: HWND
        Function: SalCreateWindow
          Description: Creates a window
          Export Ordinal: 28
          Returns
            Window Handle: HWND
          Parameters
            Template: TEMPLATE
            Window Handle: HWND
        Function: SalDestroyWindow
          Description: Destroys a window
          Export Ordinal: 29
          Returns
            Boolean: BOOL
          Parameters
            Window Handle: HWND
        Function: SalDisableWindow
          Description: Disables keyboard/mouse input to a window.
          Export Ordinal: 55
          Returns
            Boolean: BOOL
          Parameters
            Window Handle: HWND
        Function: SalEnableWindow
          Description: Enables keyboard/mouse input to a window.
          Export Ordinal: 56
          Returns
            Boolean: BOOL
          Parameters
            Window Handle: HWND
        Function: SalEndDialog
          Description: Terminates a modal dialog, sets return value.
          Export Ordinal: 47
          Returns
            Boolean: BOOL
          Parameters
            Window Handle: HWND
            Number: INT
        Function: SalIsNull
          Description: Returns TRUE if field is null.
          Export Ordinal: 19
          Returns
            Boolean: BOOL
          Parameters
            Window Handle: HWND Function: SalIsValidNumber
  Description: Returns TRUE if field is a valid SQLBASE number.
  Export Ordinal: 17
  Returns
    Boolean: BOOL
  Parameters
    Window Handle: HWND
Function: SalMessageBox
  Description: Displays message box, returns button response.
    nResult = SalMessageBox( strText, strTitle, wFlags )
  Export Ordinal: 24
  Returns
    Number: INT
  Parameters
    String: LPSTR
    String: LPSTR
    Number: WORD
Function: SalModalDialog
  Description: Creates a modal dialog box.
  Export Ordinal: 46
  Returns
    Number: INT
  Parameters
    Template: TEMPLATE
    Window Handle: HWND
Function: SalQuit
  Description: Quits the application. Equivalent to closing
    all the application's windows. The return value is returned
    the invoker of the application.
    bOK = SalQuit(nRetVal)
  Export Ordinal: 31
  Returns
    Boolean: BOOL
  Parameters
Function: SqlFetchNext
  Description: Perform a database fetch of the next row.
    bOK = SqlFetchNext( sqlHandle, nIndicator )
  Export Ordinal: 4
  Returns
    Boolean: BOOL
  Parameters
    Sql Handle: HSQLHANDLE
    Receive Number: LPINT
Function: SqlFetchPrevious
  Description: Perform a database fetch of the previous row.
    bOK = SqlFetchPrevious( sqlHandle, nIndicator )
  Export Ordinal: 6
  Returns
    Boolean: BOOL
  Parameters
    Sql Handle: HSQLHANDLE
    Receive Number: LPINT
Function: SqlImmediate
  Description: Perform a database command.
    bOK = SqlImmediate( strSqlCommand )
  Export Ordinal: 1
  Returns
    Boolean: BOOL
  Parameters
    String: LPSTR
Library name: USER.EXE
  Function: SetWindowText
    Description:
    Export Ordinal: 37
    Returns
      Number: INT
    Parameters

```
        Window Handle: HWND
        String: LPSTR
Constants
  System
    Number: SAM_Create    = 4097
    Number: SAM_FieldEdit = 0x2005
    Number: SAM_AppExit   = 8194
    Number: SAM_Click     = 8198
    Boolean: TRUE  = 1
    Boolean: FALSE = 0
        .
        .
        .
    Number: MB_Ok = 0
    Number: MB_OkCancel   = 1
    Number: MB_DefButton2 = 0x0100
    Number: IDOK     = 1
    Number: IDCANCEL = 2
  User
    !
    String: SQLWIN_VERSION  = '1.0'
    String: SQRW_VERSION    = '1.52A'
    String: WINTALK_VERSION = '1.0'
    String: SQLWIN_TABLE    = 'SQLWIN_BUGS'
    String: SQRW_TABLE      = 'SQRW_BUGS'
    String: WINTALK_TABLE   = 'WINTALK_BUGS'
    String: CURRENT_USER     = 'SYSADM'
    String: CURRENT_DATABASE = 'WINBUGS'
    String: CURRENT_FINDER   = 'QA'
    String: QRY = 'select bugno,prio,status,indate,release,bug_desc,
                   finder,fixer,ver_fixed'
    String: INTO = 'into :fld_bugno,:fld_prio,:fld_status,
                    :fld_indate,:fld_release,:fld_desc,:fld_finder,
                    :fld_fixer,:fld_ver_fixed'
    ! order by not allowed if we want fetch previous!
    String: ORDBY = ' '
    String: INSERT = ' (bugno,prio,release,status,bug_desc,indate,
                       finder,fixer,ver_fixed) values (:fld_bugno,
                       :fld_prio,:fld_release,:fld_status,:DescBuf,
                       :fld_indate,:fld_finder,:fld_fixer,
                       :fld_ver_fixed)'
    String: WHERE  = ' WHERE BUGNO = :fld_bugno '
    String: UPDATE = ' set status=:fld_status,prio=:fld_prio,
                      bug_desc=:DescBuf,fixer=:fld_fixer,
                      finder=:fld_finder,
                      ver_fixed=:fld_ver_fixed '||WHERE
    Number: LOPRIORITY = 0
    Number: HIPRIORITY = 7
    Number: UNIMPLEMENTED_PRIORITY = 7
    !
    Number: SQLWIN  = 0
    Number: WINTALK = 1
    Number: SQRW    = 2
Variables
  String: QryBuf(500)
  String: SqlDatabase(12)
  String: SqlUser(12)
  String: errmsg(60)
  String: WhereBuf(150)
  String: DescBuf(254)
  Number: err
  Number: nIndicator
  Sql Handle: cur1
  ! True if we have a current compile, and user can do a Next
  Boolean: bNextAllowed
  ! These are true if the corresponding menu item is checked
  Boolean: bDidSqlConnect
```

```
Boolean: bSelectValid
Boolean: bDefFlag
Boolean: bNoAddRow
! True if the query on the SELECT cursor is valid
Number: lParam
Number: wParam
String: szCurrentVersion(10)
String: szCurrentTable(20)
Window Handle: hWndForm
Window Handle: hWndItem
Window Handle: hWndBug
Window Handle: hWndDlg
Window Handle: hWndPBStatus
Window Handle: hWndPBPrev
Window Handle: hWndPBNext
Number: nTable
Internal Functions
  Function: DoQuery
    Description: compile, execute and fetch 1 row
    Returns
      Boolean:
    Parameters
    Local variables
    Actions
      If not SqlPrepare (curl, QryBuf)
        Set err = SqlError (curl)
        Call SqlGetErrorText (err, errmsg)
        Call SalMessageBox(errmsg, 'SqlPrepare error', MB_Ok)
        Return FALSE
      If not SqlOpen( curl, CURRENT_FINDER )
        Set err = SqlError(curl)
        Call SqlGetErrorText (err, errmsg)
        Call SalMessageBox(errmsg, 'SqlOpen error', MB_Ok)
        Return FALSE
      If not SqlFetchNext (curl, nIndicator)
        Set err = SqlError(curl)
        If err = 1
          Call SalMessageBox('No match to the query', 'Query',
            MB_Ok)
          Return FALSE
        Call SqlGetErrorText (err, errmsg)
        Call SalMessageBox(errmsg, 'Fatal SqlFetch error', MB_Ok)
        Return FALSE
      Return TRUE
  Function: Initialize
    Description:
    Returns
    Parameters
    Local variables
    Actions
      Set bNoAddRow = FALSE
      Set bDefFlag = FALSE
      Set bSelectValid = FALSE
  Function: ValidateInsert
    Description: validate fields for insert; Return TRUE on success
    Returns
      Boolean:
    Parameters
    Local variables
    Actions
      If fld_release = ''
        Set errmsg = 'Enter a release number'
        Return FALSE
      If fld_prio < LOPRIORITY or fld_prio > HIPRIORITY
        Set errmsg = 'Priority must be 0 to 6'
        Return FALSE
```

```
    If fld_status != 'OPN' and fld_status != 'FIXED'
      and fld_status
      != 'FNR' and fld_status != 'FNV' and fld_status != 'DONE'
      Set errmsg = 'Invalid status'
      Return FALSE
    If fld_desc = ''
      Set errmsg = 'Describe the bug!'
      Return FALSE
    If fld_finder = ''
      Set errmsg = 'Reported by whom?'
      Return FALSE
    If fld_fixer = ''
      Set errmsg = 'Who is it assigned to?'
      Return FALSE
    Set errmsg = ''
    Return TRUE
  Function: ClearFields
    Description: clear fields in List Window
    Returns
      Boolean:
    Parameters
    Local variables
    Actions
      Call SalClearField(fld_bugno)
      If not bDefFlag
        Call SalClearField(fld_release)
        Call SalClearField(fld_finder)
        Call SalClearField(fld_status)
        Call SalClearField(fld_ver_fixed)
      Else
        Set fld_ver_fixed = 'NOT FIXED'
      Call SalClearField(fld_prio)
      Call SalClearField(fld_indate)
      Call SalClearField(fld_desc)
      If nTable = SQLWIN
        Call SalClearField(fld_fixer)
Application Actions
  On SAM_AppExit
    If bDidSqlConnect = TRUE
      If not SqlDisconnect(curl)
        Set err = SqlError(curl)
        Call SqlGetErrorText(err, errmsg)
        Call SalMessageBox(errmsg, 'SqlDisconnect failed', MB_Ok)
Form Window: frmBug
  Title: - SQLWin Bug DB Maintainer -
  Icon File:
  Display Settings
    Visible at Design time? Yes
    Automatically Created at Runtime? Yes
    Initial State: Normal
    Maximizable? Yes
    Minimizable? Yes
    Movable? Yes
    Resizable? Yes
    Window Location and Size
    Left:   3.413"
    Top:    0.033"
    Width:  4.55"
    Height: 5.683"
  Form Size
    Width:  250.0"
    Height: 250.0"
    Number of Pages: 1
Menu
  Popup Menu: &Bug
    Menu Item: &Add
      Keyboard Accelerator: (none)
```

```
Menu Settings
  Enabled when: NOT bNoAddRow AND bDefFlag
  Checked when:
Actions
  If not ValidateInsert()
    Call SalMessageBox(errmsg, 'Invalid Add', MB_Ok)
  Else
    If bNoAddRow = TRUE
      Call SalMessageBox( 'Row already exists!',
        'Add Menu',MB_Ok)
    Else
      If SalIsNull (fld_bugno)
        Set QryBuf = 'select max(bugno)+1,sysdatetime from '
          ||szCurrentTable||' into :fld_bugno,:fld_indate'
        ! Call SalMessageBox( QryBuf, 'INSERT', MB_Ok )
        Call SqlImmediate( QryBuf )
      Else
        Set QryBuf = 'select sysdatetime from
          '||szCurrentTable||' into :fld_indate'
        ! Call SalMessageBox( QryBuf, 'INSERT', MB_Ok )
        Call SqlImmediate( QryBuf )
      Set fld_status = 'OPN'
      Set DescBuf = fld_desc
      If fld_prio = UNIMPLEMENTED_PRIORITY
        Set fld_ver_fixed = 'NOT DONE'
      Else
        Set fld_ver_fixed = 'NOT FIXED'
      Set QryBuf = 'INSERT INTO '||szCurrentTable||INSERT
      ! Call SalMessageBox( QryBuf, 'INSERT', MB_Ok )
      Call SqlImmediate( QryBuf )
      Call SqlImmediate('commit')
      ! Any select cursor is now invalid!
      Set bSelectValid = FALSE
      Set bNoAddRow = TRUE
      Call SalMessageBox( 'Bug inserted', 'INSERT', MB_Ok )
      Call SalDisableWindow( hWndPBPrev )
      Call SalDisableWindow( hWndPBNext )
      Call SalDisableWindow( hWndPBStatus )
Menu Item: &Update
  Keyboard Accelerator: (none)
  Menu Settings
    Enabled when: bSelectValid
    Checked when:
  Actions
    If not ValidateInsert()
      Call SalMessageBox(errmsg, 'Invalid Update', MB_Ok)
    Else
      Set DescBuf = fld_desc
      If fld_status = 'FIXED' or fld_status = 'DONE'
        Set fld_ver_fixed = szCurrentVersion
      Else
        If fld_prio = 5
          Set fld_ver_fixed = 'NOT DONE'
        Else
          Set fld_ver_fixed = 'NOT FIXED'
      Set QryBuf = 'update '||szCurrentTable||UPDATE
      ! Call SalMessageBox( QryBuf, 'UPDATE', MB_Ok )
      Call SqlImmediate( QryBuf )
      Call SqlImmediate('commit')
      ! Any select cursor is now invalid!
      Set bSelectValid = FALSE
      Call SalMessageBox( 'Bug updated', 'UPDATE', MB_Ok )
      Set bNoAddRow = FALSE
      Call SalDisableWindow( hWndPBPrev )
      Call SalDisableWindow( hWndPBNext )
      Call SalDisableWindow( hWndPBStatus )
Menu Separator
```

```
Menu Item: &Delete
  Keyboard Accelerator: (none)
  Menu Settings
    Enabled when: bSelectValid
    Checked when:
  Actions
    If SalMessageBox( 'Ok to delete??', 'DELETE OPTION',
        MB_OkCancel|MB_DefButton2 ) = IDOK
      Set QryBuf = 'DELETE FROM '||szCurrentTable||WHERE
      ! Call SalMessageBox( QryBuf, 'DELETE', MB_Ok )
      Call SqlImmediate ( QryBuf )
      Call SalMessageBox( 'Bug Deleted!', 'DELETE', MB_Ok )
      Call ClearFields()
      Set bSelectValid = FALSE
      Set bNoAddRow = FALSE
      Call SalDisableWindow( hWndPBPrev )
      Call SalDisableWindow( hWndPBNext )
      Call SalDisableWindow( hWndPBStatus )
    Else
      Call SalMessageBox( 'Row NOT deleted!', 'DELETE', MB_Ok)
Menu Separator
Menu Item: &Commit
  Keyboard Accelerator: (none)
  Menu Settings
    Enabled when:
    Checked when:
  Actions
    Call SqlImmediate ('commit')
    ! Any Select cursor is now invalid
    Set bSelectValid = FALSE
    Call  SalMessageBox( 'DB committed!', 'COMMIT', MB_Ok )
Menu Item: &Rollback
  Keyboard Accelerator: (none)
  Menu Settings
    Enabled when:
    Checked when:
  Actions
    Call SqlImmediate ('rollback')
    Call SalMessageBox( 'DB rolled back!', 'ROLLBACK', MB_Ok)
Menu Separator
Menu Item: E&xit
  Keyboard Accelerator: (none)
  Menu Settings
    Enabled when:
    Checked when:
  Actions
    If SalMessageBox( 'Really quit?', 'Bug DataBase',
        MB_OkCancel|MB_DefButton2) = IDOK
      Call SalQuit()
Menu Item: Select&Row
  Keyboard Accelerator: (none)
  Menu Settings
    Enabled when:
    Checked when:
  Actions
    If SalIsNull(fld_bugno)
      Call SalMessageBox('No Row Number!','OneRow Error', MB_Ok)
    Else
      Set QryBuf = QRY||' FROM '||szCurrentTable||WHERE
                   ||ORDBY||INTO
      ! Call SalMessageBox( QryBuf, 'QUERY ONE', MB_Ok )
      If DoQuery()
        Set bSelectValid = TRUE
        Set bNoAddRow = TRUE
        If fld_status = 'FIXED' OR fld_status = 'DONE'
          Call SalDisableWindow( hWndPBStatus )
        Else
```

```
                    Call SalEnableWindow( hWndPBStatus )
                 If fld_prio = HIPRIORITY
                    Call SetWindowText( hWndPBStatus, 'Set Status DONE' )
                 Else
                    Call SetWindowText( hWndPBStatus, 'Set Status FIXED' )
           Call SalDisableWindow( hWndPBPrev )
           Call SalDisableWindow( hWndPBNext )
    Menu Item: Select&Set
       Keyboard Accelerator: (none)
       Menu Settings
          Enabled when:
          Checked when:
       Actions
          If SalIsNull(fld_bugno)
             Set QryBuf = QRY||' FROM '||szCurrentTable||' '||ORDBY||INTO
          Else
             Set QryBuf = QRY||' FROM '||szCurrentTable||
                         ' WHERE BUGNO >= :fld_bugno '||ORDBY||INTO
          ! Call SalMessageBox( QryBuf, 'QUERY  1', MB_Ok )
          If DoQuery()
             Set bSelectValid = TRUE
             Set bNoAddRow = TRUE
             If fld_status = 'FIXED' OR fld_status = 'DONE'
                Call SalDisableWindow( hWndPBStatus )
             Else
                Call SalEnableWindow( hWndPBStatus )
                If fld_prio = HIPRIORITY
                   Call SetWindowText( hWndPBStatus, 'Set Status DONE' )
                Else
                   Call SetWindowText( hWndPBStatus, 'Set Status FIXED' )
             Call SalEnableWindow( hWndPBPrev )
             Call SalEnableWindow( hWndPBNext )
    Menu Item: &Clear
       Keyboard Accelerator: (none)
       Menu Settings
          Enabled when:
          Checked when:
       Actions
          Call ClearFields()
          Set bNoAddRow = FALSE
          Set bSelectValid = FALSE
          Call SalDisableWindow( hWndPBPrev )
          Call SalDisableWindow( hWndPBNext )
          Call SalDisableWindow( hWndPBStatus )
    Menu Item: &NewBugs
       Keyboard Accelerator: (none)
       Menu Settings
          Enabled when:
          Checked when:
       Actions
          Call SalCreateWindow( dlgDefault, hWndForm )
Contents
   Pushbutton: fldNextButton
      Title: Ne&xt
      Window Location and Size
         Left:   2.588"
         Top:    0.483"
         Width:  1.2"
         Height: 0.283"
      Keyboard Accelerator: (none)
      Message Actions
         On SAM_Create
            Set hWndPBNext = hWndItem
            Call SalDisableWindow( hWndPBNext )
         On SAM_Click
            Call ClearFields()
            If bSelectValid
               If not SqlFetchNext (cur1, nIndicator)
```

```
            Call SalMessageBox('End of fetch', 'QUERY', MB_Ok)
          Else
            If fld_status = 'FIXED' OR fld_status = 'DONE'
              Call SalDisableWindow( hWndPBStatus )
            Else
              Call SalEnableWindow( hWndPBStatus )
              If fld_prio = HIPRIORITY
                Call SetWindowText( hWndPBStatus,'Set Status DONE')
              Else
                Call SetWindowText( hWndPBStatus,'Set Status FIXED'
      Else
        Call SalMessageBox('You must do another Select command!',
           'BugDev', MB_Ok)
Pushbutton: fld_previous
  Title: Pre&vious
  Window Location and Size
    Left:   2.588"
    Top:    0.867"
    Width:  1.2"
    Height: 0.283"
  Keyboard Accelerator: (none)
  Message Actions
    On SAM_Create
      Set hWndPBPrev = hWndItem
      Call SalDisableWindow( hWndPBPrev )
    On SAM_Click
      Call ClearFields()
      If bSelectValid
        If not SqlFetchPrevious (curl, nIndicator)
          Call SalMessageBox('End of fetch','QUERY',MB_Ok)
        Else
          If fld_status = 'FIXED' OR fld_status = 'DONE'
            Call SalDisableWindow( hWndPBStatus )
          Else
            Call SalEnableWindow( hWndPBStatus )
            If fld_prio = HIPRIORITY
              Call SetWindowText( hWndPBStatus,'Set Status DONE')
            Else
              Call SetWindowText( hWndPBStatus,'Set Status FIXED'
      Else
        Call SalMessageBox('You must do another Select command!',
           'BugDev', MB_Ok)
Background Text: &Number:
  Window Location and Size
    Left:   0.088"
    Top:    0.5"
    Width:  0.8"
    Height: 0.233"
  Justify: Left
Data Field: fld_bugno
  Data
    Maximum Data Length: Dynamic
    Data Type: Number
    Editable? Yes
  Display Settings
    Window Location and Size
      Left:   1.288"
      Top:    0.467"
      Width:  1.0"
      Height: 0.25"
    Border? Yes
    Format: Unformatted
    Country: Default
  Message Actions
    On SAM_FieldEdit
      If not SalIsValidNumber(fld_bugno)
        Call SalMessageBox('Field: Bug Number', 'Invalid Number',
```

```
        MB_Ok)
    Set fld_bugno = 1
Background Text: &Priority:
  Window Location and Size
    Left:   0.088"
    Top:    1.117"
    Width:  0.9"
    Height: 0.233"
  Justify: Left
Data Field: fld_prio
  Data
    Maximum Data Length: Dynamic
    Data Type: Number
    Editable? Yes
  Display Settings
    Window Location and Size
      Left:   1.288"
      Top:    1.083"
      Width:  1.0"
      Height: 0.25"
    Border? Yes
    Format: Unformatted
    Country: Default
  Message Actions
Background Text: &Status:
  Window Location and Size
    Left:   0.088"
    Top:    1.433"
    Width:  0.8"
    Height: 0.233"
  Justify: Left
Data Field: fld_status
  Data
    Maximum Data Length: Dynamic
    Data Type: String
    Editable? Yes
  Display Settings
    Window Location and Size
      Left:   1.288"
      Top:    1.4"
      Width:  1.0"
      Height: 0.25"
    Border? Yes
    Format: Unformatted
    Country: Default
  Message Actions
Background Text: D&escription:
  Window Location and Size
    Left:   0.088"
    Top:    2.533"
    Width:  1.2"
    Height: 0.217"
  Justify: Left
Background Text: Reported &By:
  Window Location and Size
    Left:   0.088"
    Top:    4.167"
    Width:  1.2"
    Height: 0.217"
  Justify: Left
Data Field: fld_finder
  Data
    Maximum Data Length: Dynamic
    Data Type: String
    Editable? Yes
  Display Settings
    Window Location and Size
```

```
        Left:    1.388"
        Top:     4.133"
        Width:   2.7"
        Height:  0.25"
      Border? Yes
      Format: Unformatted
      Country: Default
    Message Actions
Data Field: fld_fixer
  Data
    Maximum Data Length: Dynamic
    Data Type: String
    Editable? Yes
  Display Settings
    Window Location and Size
      Left:    1.388"
      Top:     4.45"
      Width:   1.1"
      Height:  0.25"
    Border? Yes
    Format: Unformatted
    Country: Default
  Message Actions
Background Text: Assigned &To:
  Window Location and Size
    Left:    0.088"
    Top:     4.483"
    Width:   1.2"
    Height:  0.217"
  Justify: Left
Background Text: &Release:
  Window Location and Size
    Left:    0.088"
    Top:     0.817"
    Width:   0.8"
    Height:  0.233"
  Justify: Left
Data Field: fld_release
  Data
    Maximum Data Length: Dynamic
    Data Type: String
    Editable? Yes
  Display Settings
    Window Location and Size
      Left:    1.288"
      Top:     0.767"
      Width:   1.0"
      Height:  0.283"
    Border? Yes
    Format: Unformatted
    Country: Default
  Message Actions
Background Text: &Date:
  Window Location and Size
    Left:    0.088"
    Top:     2.3"
    Width:   0.6"
    Height:  0.15"
  Justify: Left
Data Field: fld_indate
  Data
    Maximum Data Length: Dynamic
    Data Type: Date/Time
    Editable? Yes
  Display Settings
    Window Location and Size
      Left:    1.288"
```

```
      Top:    2.233"
      Width:  2.8"
      Height: 0.333"
    Border? Yes
    Format: Unformatted
    Country: Default
  Message Actions
Background Text: Ver. Fixed:
  Window Location and Size
    Left:   0.088"
    Top:    1.767"
    Width:  1.1"
    Height: 0.233"
  Justify: Left
Data Field: fld_ver_fixed
  Data
    Maximum Data Length: Dynamic
    Data Type: String
    Editable? No
  Display Settings
    Window Location and Size
      Left:   1.288"
      Top:    1.733"
      Width:  1.1"
      Height: 0.25"
    Border? Yes
    Format: Unformatted
    Country: Default
  Message Actions
Multiline Field: fld_desc
  Data
    Data Type: String
    Editable? Yes
  Display Settings
    Border? Yes
    Word Wrap? Yes
    Vertical Scroll? No
    Format: Unformatted
    Country: Default
    Window Location and Size
      Left:   0.088"
      Top:    2.817"
      Width:  4.0"
      Height: 1.233"
  Message Actions
Background Text: Current Version:
  Window Location and Size
    Left:   1.688"
    Top:    1.983"
    Width:  1.7"
    Height: 0.217"
  Justify: Left
Data Field: dfcurr_ver
  Data
    Maximum Data Length: Dynamic
    Data Type: String
    Editable? Yes
  Display Settings
    Window Location and Size
      Left:   3.388"
      Top:    1.917"
      Width:  0.7"
      Height: 0.25"
    Border? Yes
    Format: Unformatted
    Country: Default
  Message Actions
```

```
Pushbutton: pbSetStatus
  Title: Set Status FIXED
  Window Location and Size
    Left:   2.375"
    Top:    1.367"
    Width:  1.8"
    Height: 0.283"
  Keyboard Accelerator: (none)
  Message Actions
    On SAM_Create
      Set hWndPBStatus = hWndItem
      Call SalDisableWindow( hWndPBStatus )
    On SAM_Click
          If fld_prio = HIPRIORITY
            Set fld_status = 'DONE'
          Else
            Set fld_status = 'FIXED'
    Data Field: dfTitle
      Data
        Maximum Data Length: Dynamic
        Data Type: String
        Editable? No
      Display Settings
        Window Location and Size
          Left:   0.688"
          Top:    0.083"
          Width:  2.8"
          Height: 0.25"
        Border? No
        Format: Unformatted
        Country: Default
      Message Actions
  Variables
  Message Actions
    On SAM_Create
      Set hWndBug = hWndForm
      Call SalModalDialog( dlgLogon, hWndForm )
      Set dfcurr_ver = szCurrentVersion
      Call Initialize()
Dialog Box: dlgDefault
  Title: Default Settings
  Display Settings
    Visible at Design time? No
    Type of Dialog: Modeless
    Window Location and Size
      Left:   1.975"
      Top:    1.483"
      Width:  3.55"
      Height: 3.1"
    Absolute Screen Location? Yes
  Contents
    Data Field: dfRelease
      Data
        Maximum Data Length: Dynamic
        Data Type: String
        Editable? Yes
      Display Settings
        Window Location and Size
          Left:   0.188"
          Top:    0.511"
          Width:  0.7"
          Height: 0.256"
        Border? Yes
        Format: Unformatted
        Country: Default
      Message Actions
    Data Field: dfFinder
      Data
```

```
      Maximum Data Length: Dynamic
      Data Type: String
      Editable? Yes
    Display Settings
      Window Location and Size
        Left:   0.788"
        Top:    2.044"
        Width:  1.9"
        Height: 0.256"
      Border? Yes
      Format: Unformatted
      Country: Default
    Message Actions
  Data Field: dfVersion
    Data
      Maximum Data Length: Dynamic
      Data Type: String
      Editable? No
    Display Settings
      Window Location and Size
        Left:   2.288"
        Top:    0.844"
        Width:  0.7"
        Height: 0.256"
      Border? Yes
      Format: Unformatted
      Country: Default
    Message Actions
  Data Field: dfSqlDB
    Data
      Maximum Data Length: Dynamic
      Data Type: String
      Editable? No
    Display Settings
      Window Location and Size
        Left:   1.788"
        Top:    1.156"
        Width:  1.2"
        Height: 0.256"
      Border? Yes
      Format: Unformatted
      Country: Default
    Message Actions
  Data Field: dfSqlUser
    Data
      Maximum Data Length: Dynamic
      Data Type: String
      Editable? No
    Display Settings
      Window Location and Size
        Left:   1.788"
        Top:    1.467"
        Width:  1.2"
        Height: 0.256"
      Border? Yes
      Format: Unformatted
      Country: Default
    Message Actions
  Check Box: ckCurrent
    Title: Use Current Version:
    Window Location and Size
      Left:   0.988"
      Top:    0.511"
      Width:  2.3"
      Height: 0.256"
    Message Actions
      On SAM_Click
        If ckCurrent = TRUE
```

```
            Set dfRelease= szCurrentVersion
         Else
            Set dfRelease = ''
Background Text: Enter a Version Number:
   Window Location and Size
      Left:    0.188"
      Top:     0.289"
      Width:   3.0"
      Height:  0.167"
   Justify: Left
Background Text: Who reported the problem?
   Window Location and Size
      Left:    0.188"
      Top:     1.811"
      Width:   2.6"
      Height:  0.167"
   Justify: Left
Background Text: Current Version:
   Window Location and Size
      Left:    0.688"
      Top:     0.878"
      Width:   1.6"
      Height:  0.167"
   Justify: Left
Background Text: DEFAULTS FOR NEW BUGS:
   Window Location and Size
      Left:    0.688"
      Top:     0.022"
      Width:   2.3"
      Height:  0.189"
   Justify: Left
Background Text: SQL db Name:
   Window Location and Size
      Left:    0.188"
      Top:     1.189"
      Width:   1.4"
      Height:  0.167"
   Justify: Left
Background Text: SQL User Name:
   Window Location and Size
      Left:    0.188"
      Top:     1.5"
      Width:   1.5"
      Height:  0.167"
   Justify: Left
Pushbutton: pbOK
   Title: OK
   Window Location and Size
      Left:    1.388"
      Top:     2.378"
      Width:   0.7"
      Height:  0.3"
   Keyboard Accelerator: (none)
   Message Actions
      On SAM_Click
         If SalIsNull( dfVersion )
            Call SalMessageBox( 'Enter a version', 'dlgDefault', MB_Ok
         Else
            Call ClearFields()
            Set hWndBug.frmBug.fld_release = dfRelease
            Set hWndBug.frmBug.fld_status = 'OPN'
            Set hWndBug.frmBug.fld_ver_fixed = 'NOT FIXED'
            Set hWndBug.frmBug.fld_finder = dfFinder
            If nTable = WINTALK
               Set hWndBug.frmBug.fld_fixer = 'MR'
            Else If nTable = SQRW
               Set hWndBug.frmBug.fld_fixer = 'IS'
            Set bDefFlag  = TRUE
```

```
                Set bNoAddRow = FALSE
                Set bSelectValid = FALSE
                Call SalDestroyWindow( dlgDefault )
        Variables
        Message Actions
            On SAM_Create
                Set hWndDlg = hWndForm
                Set dfVersion = szCurrentVersion
                Set dfFinder = CURRENT_FINDER
                Set dfSqlDB = CURRENT_DATABASE
                Set dfSqlUser = CURRENT_USER
Dialog Box: dlgLogon
    Title:
    Display Settings
        Visible at Design time? No
        Type of Dialog: Modal
        Window Location and Size
            Left:    2.013"
            Top:     1.5"
            Width:   3.163"
            Height:  3.017"
        Absolute Screen Location? Yes
    Contents
        Background Text: BUGDEV - WINBUGS LOGON
            Window Location and Size
                Left:    0.388"
                Top:     0.1"
                Width:   2.2"
                Height:  0.167"
            Justify: Left
        Group Box: &Table:
            Window Location and Size
                Left:    0.388"
                Top:     0.456"
                Width:   2.3"
                Height:  1.244"
        Radio Button: rbSqlwin
            Title: SQLWindows
            Window Location and Size
                Left:    0.688"
                Top:     0.689"
                Width:   1.3"
                Height:  0.256"
            Message Actions
                On SAM_Create
                    Set dfVersion = SQLWIN_VERSION
                    Set szCurrentTable = SQLWIN_TABLE
                    Set nTable = SQLWIN
                On SAM_Click
                    Set dfVersion = SQLWIN_VERSION
                    Set szCurrentTable = SQLWIN_TABLE
                    Set nTable = SQLWIN
        Radio Button: rbWintalk
            Title: SQLTalk/Windows
            Window Location and Size
                Left:    0.688"
                Top:     1.0"
                Width:   1.8"
                Height:  0.25"
            Message Actions
                On SAM_Click
                    Set dfVersion = WINTALK_VERSION
                    Set szCurrentTable = WINTALK_TABLE
                    Set nTable = WINTALK
        Radio Button: rbSqrw
            Title: SQRW
            Window Location and Size
```

```
        Left:   0.688"
        Top:    1.311"
        Width:  0.8"
        Height: 0.256"
     Message Actions
        On SAM_Click
           Set dfVersion = SQRW_VERSION
           Set szCurrentTable = SQRW_TABLE
           Set nTable = SQRW
Background Text: Default ver:
   Window Location and Size
        Left:   0.388"
        Top:    1.967"
        Width:  1.2"
        Height: 0.167"
    Justify: Left
Data Field: dfVersion
   Data
      Maximum Data Length: Dynamic
      Data Type: String
      Editable? Yes
   Display Settings
      Window Location and Size
         Left:   1.688"
         Top:    1.933"
         Width:  1.0"
         Height: 0.256"
      Border? Yes
      Format: Unformatted
      Country: Default
   Message Actions
Pushbutton: pbLogon
   Title: &Logon
   Window Location and Size
        Left:   0.388"
        Top:    2.4"
        Width:  0.9"
        Height: 0.289"
   Keyboard Accelerator: (none)
   Message Actions
      On SAM_Click
         Set szCurrentVersion = dfVersion
         Set dfcurr_ver = szCurrentVersion
         Set dfTitle = 'Current Table: '||szCurrentTable
         Set SqlUser = CURRENT_USER
         Set SqlDatabase = CURRENT_DATABASE
         Call SalEndDialog( dlgLogon, TRUE )
         If not SqlConnect(curl)
            Set err = SqlError(curl)
            Call SqlGetErrorText(err, errmsg)
            Call SalMessageBox(errmsg, 'SqlConnect failed', MB_Ok)
            Set bDidSqlConnect = FALSE
            Call SalQuit()
         Else
            Set bDidSqlConnect = TRUE
Pushbutton: pbCancel
   Title: &Cancel
   Window Location and Size
        Left:   1.588"
        Top:    2.4"
        Width:  1.0"
        Height: 0.289"
   Keyboard Accelerator: (none)
   Message Actions
      On SAM_Click
         Set bDidSqlConnect = FALSE
         Call SalQuit()
Variables
Message Actions
```

What is claimed is:

1. A method of composing computer programs using a programmed digital computer having a display, the steps of the method comprising:

storing in a computer memory coupled to said computer outline item definition data which defines a set of program outline items which can be selected and combined under the control of said computer to form a computer program so that said computer program will accomplish a specified set of tasks;

said stored outline item definition data including data specifying a set of outline item characteristics governing the usage of each of sad outline item, including for each said outline item a set of required children, comprising outline items that must be included at the next lower outline level than said outline item each time said outline item is used in a computer program, and optional children, comprising outline items that may be included at the next lower outline level than said outline item when said outline item is used in a computer program;

storing in said computer memory a computer program comprising a selection of said outline items arranged in a multilevel outline, wherein the items at each outline level except the topmost level are the children of the preceding outline item at the next higher outline level;

interactively, in response to user commands, adding selected outline items to said stored computer program, said adding step including the steps of selecting a position in said multilevel outline to add an outline item, thereby selecting a parent outline item one outline level higher than the outline item to be added to said stored computer program, and selecting an outline item to be added to said stored computer program;

said adding step including the steps of restricting selected outline items that are to be added to said stored computer program to the optional children of said parent outline item, as specified by said stored outline item definition data, and automatically adding to said stored computer program, at the next outline level lower than an added outline item, said required children for said added outline item;

displaying on said display a selected contiguous portion of said multilevel outline, including automatically changing the display of said multilevel outline to incorporate outline items added to said computer program;

storing in said computer memory for each outline item an expansion indicator, the status of which denotes whether the corresponding outline item has children and whether the display of said children is enabled; and providing user interface means for interactively changing the status of said expansion indicators for specified outline items;

wherein the user is prevented from adding a outline item that is not included in said set of optional children for said parent outline item; and wherein said displaying step displays only outline items whose display is enabled by a corresponding expansion indicator, and includes the step of responding to changes in the status of said expansion indicators by updating the display of said multilevel outline so as to reflect the current status of said expansion indicators.

2. A method as set forth in claim 1, further including the steps of:

under the control of said composing program, interactively responding to user commands by modifying selected ones of the previously defined outline items in a selected computer program, and deleting selected ones of the previously defined outline items in a selected computer program; said deleting step including the step of automatically deleting all children outline items of each deleted outline item.

3. A method as set forth in claim 1, further including:

under the control of said composing program, interactively responding to user commands by drawing a display oriented program object on said display, and automatically adding the corresponding outline items to a selected computer program;

whereby display oriented program objects can be interactively defined with or without reference to the corresponding outline items.

4. A method as set forth in claim 3, further including:

under the control of said composing program, interactively responding to user commands by modifying a display oriented program object in a selected computer program by modifying a corresponding image on said display, and automatically modifying said corresponding outline items in said selected computer program.

5. A method as set forth in claim 1, wherein said selection of outline items collectively and completely denote the nature and operation of said specified computer program.

6. A method as set forth in claim 1, said step of storing a set of program outline items including the step of storing in said computer memory a predefined set of program objects and corresponding predefined sets of outline items for representing said program objects;

said step of storing a computer program including the step of selecting, under the control of said composing program, a set of program objects from said predefining set of program objects, and storing in said computer memory a corresponding set of outline items, arranged in a multilevel outline, wherein said corresponding set of outline items collectively and completely denote the nature and operation of said specified program objects and said specified computer program.

7. A method of composing computer programs using a programmed digital computer having a display, the composing method comprising:

storing in a computer memory outline item definition data which defines a set of program objects, and a corresponding set of outline items for representing said program objects;

said stored outline item definition data including data specifying a set of outline item characteristics governing the usage of each of sad outline item, including for each said outline item a set of required children, comprising outline items that must be included at the next lower outline level than said outline item each time said outline item is used in a computer program, and a set of optional children, comprising outline items that may be included at the next lower outline level than said outline item when said outline item is used in a computer program;

storing in said computer memory a pre-existing computer program comprising a set of specified program objects and a corresponding multilevel outline of outline items which collectively and completely denote the nature and operation of said specified program objects;

under the control of a composing program, storing in said computer memory for each outline item an expansion indicator, the status of which denotes whether the corresponding outline item has children and whether the display of said children is enabled;

under the control of said composing program, displaying on said display a selected contiguous portion of said multilevel outline, showing only outline items whose display is enabled by a corresponding expansion indicator;

providing user interface means for interactively changing the status of said expansion indicators for specified outline items;

said displaying step including the step of responding to changes in the status of said expansion indicators by updating the display of said multilevel outline so as to reflect the current status of said expansion indicators; and under the control of said composing program, interactively responding to user commands by adding further outline items to said computer program, said adding step including the steps of selecting a position in said multilevel outline to add a outline item, thereby selecting a parent outline item on outline level higher than the outline item to be added to the computer program, and selecting a outline item to be added to said program from said set of optional children for said parent outline item;

said adding step including, under the control of said composing program, automatically adding to said computer program, at the next outline level lower than an added outline item, said required children for said added outline item;

wherein the user is prevented from adding a outline item that is not included in said set of optional children from said parent outline item;

wherein said displaying step automatically changes the display of said multilevel outline to incorporate outline items added to said computer program.

8. A method as set forth in claim 7, said adding step including;

under the control of said composing program, automatically adding to said selected computer program, at the next outline level lower than an added outline item, said required children for said added outline item;

whereby required children are automatically added to said computer program when a corresponding parent outline item is added to said computer program.

9. A method as set forth in claim 7, further including:

under the control of said composing program, interactively responding to user commands by modifying selected ones of the previously defined outline items in said computer program, and deleting selected ones of the previously defined outline items in said computer program.

10. A method of using a programmed digital computer having a display that can show at least a portion of the source code for a specified computer program, the steps of the method comprising:

storing in a computer memory a set of outline items which can be selected and combined under the control of said computer to form a computer program, a multiplicity of said outline items having subitem means for including one or more additional outline items as part of said outline item;

each said outline item having a predefined display item format which defines the appearance of a said outline item when said computer program is shown on said display, each display item format including an expansion indicator, the status of which denotes whether the corresponding outline item includes additional outline items and whether the display of said additional outline items is enabled;

under the control of an outliner program, performing the steps of:

interactively responding to user commands, by generating and storing in said computer memory an initial computer program comprising a specified set of said outline items arranged in a multilevel outline, said generating and storing steps including the step of adding additional ones of said set of outline items to said stored computer program;

automatically adding to said stored computer program a set of initial required outline items at the topmost level of said multilevel outline, at least a plurality of said initial required outline items representing a class of objects which may be included in said stored computer program;

for each outline item added to said stored computer program, automatically adding to said computer program corresponding required additional outline items, if any, associated with said outline item;

displaying, in an indented multilevel outline format, a specified contiguous portion of said specified set of outline items, showing only outline items whose display is enabled by corresponding expansion indicators, each displayed outline item having its appearance defined the corresponding display item format; and interactively responding to user commands by expanding and contracting specified ones of said outline items by changing the status of the corresponding expansion indicator; said displaying step including the step of updating the display of said specified outline items so as to reflect the current status of said expansion indicators;

thereby enabling a computer programmer to interactively generate and modify a computer program comprising a specified combination of said outline items.

* * * * *